US012623439B2

(12) United States Patent
Kadowaki et al.

(10) Patent No.: US 12,623,439 B2
(45) Date of Patent: May 12, 2026

(54) RESIN FILM-LAMINATED METAL SHEET AND METHOD FOR MANUFACTURING SAME

(71) Applicant: NIPPON STEEL CORPORATION, Tokyo (JP)

(72) Inventors: Nobuo Kadowaki, Tokyo (JP); Kazushi Iwakiri, Tokyo (JP); Tomohiro Mizutani, Tokyo (JP); Daisuke Yasufuku, Tokyo (JP); Tomoya Hara, Tokyo (JP); Satoshi Kato, Tokyo (JP); Yuta Tajima, Tokyo (JP); Yuki Nagai, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 736 days.

(21) Appl. No.: 17/606,909

(22) PCT Filed: Jun. 23, 2020

(86) PCT No.: PCT/JP2020/024507
§ 371 (c)(1),
(2) Date: Oct. 27, 2021

(87) PCT Pub. No.: WO2021/006024
PCT Pub. Date: Jan. 14, 2021

(65) Prior Publication Data
US 2022/0203654 A1 Jun. 30, 2022

(30) Foreign Application Priority Data
Jul. 5, 2019 (JP) ................................. 2019-125682

(51) Int. Cl.
*B32B 15/095* (2006.01)
*B29C 44/12* (2006.01)
(Continued)

(52) U.S. Cl.
CPC ............ *B32B 15/095* (2013.01); *B29C 44/12* (2013.01); *B32B 5/20* (2013.01); *B32B 7/02* (2013.01);
(Continued)

(58) Field of Classification Search
CPC ..... Y10T 428/31678; Y10T 428/31681; Y10T 428/31692; Y10T 428/31725;
(Continued)

(56) References Cited

U.S. PATENT DOCUMENTS

| | | | | |
|---|---|---|---|---|
| 5,061,575 A | * | 10/1991 | Mohri | ..................... C23C 28/00 428/626 |
| 5,308,709 A | * | 5/1994 | Ogino | ...................... B05D 7/51 428/626 |

(Continued)

FOREIGN PATENT DOCUMENTS

| | | | | |
|---|---|---|---|---|
| JP | H10113724 A | * | 5/1998 | |
| JP | 10226010 A | * | 8/1998 | |

(Continued)

OTHER PUBLICATIONS

Machine translation (Espacenet) of JP 10-226010 A. Translated Sep. 19, 2024. (Year: 2024).*

(Continued)

*Primary Examiner* — Maria V Ewald
*Assistant Examiner* — Ethan A Utt
(74) *Attorney, Agent, or Firm* — Birch, Stewart, Kolasch & Birch, LLP

(57) ABSTRACT

A resin film-laminated metal sheet includes a metal sheet and thermoplastic resin films that are fused to both surfaces of the metal sheet, the metal sheet is a steel sheet having a thickness of 0.08 mm or more or an aluminum sheet having a thickness of 0.15 mm or more, and, when a surface of the thermoplastic resin film opposite to a surface that is fused to (Continued)

the metal sheet is defined as a first surface, the surface tension on the first surface in at least one of the thermoplastic resin films is 50 mN/m or less, the surface tension on the surface that is fused to the metal sheet is 36 mN/m or more, and the amount of a wax attached to the first surface is more than 0 mg/m² and 5.00 mg/m² or less.

8 Claims, 4 Drawing Sheets

(51) Int. Cl.
    *B29K 75/00*     (2006.01)
    *B29K 105/04*     (2006.01)
    *B32B 5/20*     (2006.01)
    *B32B 7/02*     (2019.01)
    *B32B 15/18*     (2006.01)
    *B32B 15/20*     (2006.01)
(52) U.S. Cl.
    CPC .............. *B32B 15/18* (2013.01); *B32B 15/20* (2013.01); *B29K 2075/00* (2013.01); *B29K 2105/04* (2013.01); *B32B 2266/0278* (2013.01); *B32B 2307/732* (2013.01)
(58) Field of Classification Search
    CPC ..... Y10T 428/31786; Y10T 428/31801; Y10T 428/31855; Y10T 428/31938; Y10T 428/24942; Y10T 428/2495; Y10T 428/24967; Y10T 428/26; Y10T 428/266; Y10T 428/269; Y10T 428/27; Y10T 428/273; Y10T 428/31; Y10T 428/31714; Y10T 428/12493; Y10T 428/12535; Y10T 428/12542; Y10T 428/12549; Y10T 428/12556; Y10T 428/12569; Y10T 428/12736; Y10T 428/12764; Y10T 428/12771; Y10T 428/12861; Y10T 428/12951; Y10T 428/12958; Y10T 428/12965; Y10T 428/12972; Y10T 428/12979; Y10T 428/249953; Y10T 428/249987; Y10T 428/249991; Y10T 428/249992; Y10T 428/249993; Y10T 428/263; Y10T 428/264; Y10T 428/265; Y10T 428/31551; Y10T 428/31554; Y10T 428/31562; Y10T 428/31565; Y10T 428/31573; Y10T 428/31587; Y10T 428/31605; B32B 15/00; B32B 15/04;
B32B 15/08; B32B 15/085; B32B 15/088; B32B 15/09; B32B 15/18; B32B 7/00; B32B 7/02; B32B 7/04; B32B 15/20; B32B 27/00; B32B 27/04; B32B 27/14; B32B 27/32; B32B 27/36; B32B 33/00; B32B 2307/746; B32B 5/00; B32B 5/18; B32B 5/20; B32B 15/046; B32B 15/095; B32B 27/40; B32B 2266/00; B32B 2266/02; B32B 2266/0214; B32B 2266/0278; B32B 2305/00; B32B 2305/02; B32B 2305/022
    USPC ......... 428/457, 458, 461, 474.4, 484.4, 500, 428/523, 212, 213, 215, 219, 220, 332, 428/337, 339, 340, 341, 409, 467, 480, 428/484.1, 304.4, 318.4, 319.1, 319.3, 428/319.7, 319.9, 334, 335, 336, 423.1, 428/423.5, 423.7, 424.2, 424.8, 425.8, 428/615, 621, 622, 623, 624, 626, 650, 428/654, 655, 668, 681, 682, 683, 684, 428/685, 687
    See application file for complete search history.

(56) References Cited

U.S. PATENT DOCUMENTS

2004/0101698 A1* 5/2004 Yamanaka .............. B32B 15/08
    428/461
2012/0088122 A1* 4/2012 Matsuda ................ C09D 5/082
    428/653
2019/0283345 A1 9/2019 Uesaka et al.

FOREIGN PATENT DOCUMENTS

| JP | 2000-351174 | A | 12/2000 |
|----|-------------|---|---------|
| JP | 2006-150606 | A | 6/2006 |
| JP | 2009-78543 | A | 4/2009 |
| JP | 4326001 | B2 | 9/2009 |
| JP | 2010-23440 | A | 2/2010 |
| JP | 5553542 | B2 | 7/2014 |
| JP | 2018-187939 | A | 11/2018 |

OTHER PUBLICATIONS

Machine translation (Espacenet) of JP 10-113724 A. Translated Jul. 11, 2025. (Year: 2025).*

* cited by examiner

RESIN FILM-LAMINATED METAL SHEET AND METHOD FOR MANUFACTURING SAME

TECHNICAL FIELD

The present invention relates to a material for a laminated panel that is used as a measure for reduction in the weights of floors and wall materials of building materials, ships and vehicles and particularly to a resin film-laminated metal sheet that is used for a laminated panel having a foam resin core layer between two metal sheets.

Priority is claimed on Japanese Patent Application No. 2019-125682, filed in Japan on Jul. 5, 2019, the content of which is incorporated herein by reference.

BACKGROUND ART

As a measure for reduction in the weights of floors and wall materials of building materials, ships and vehicles, a laminated lightweight panel having, as a core layer, a foam resin layer or an aluminum honeycomb or paper honeycomb layer laminated and attached between two metal sheets has been proposed and put into practical use.

As a laminated panel in which a foam resin is used for the core layer, an example of a laminated panel having an adhesive layer and a non-foaming resin layer provided between a metal sheet and a foam resin sequentially from the metal sheet side, which is described in Patent Document 1, is an exemplary example, and, as a laminated panel in which a honeycomb is used for the core layer, Patent Document 2 describes an example of a method for manufacturing a sandwich panel having sheet-like prepregs cured on both surfaces of a sheet-like core layer having a honeycomb structure.

In addition, Patent Document 3 describes an example of a resin sheet-laminated metal sheet having at least a resin sheet (b) in which a metal sheet is embedded and a steel sheet that is positioned on a surface of the resin sheet (b) opposite to the other surface in contact with a resin sheet (a) sequentially laminated on both surfaces of the resin sheet (a), in which, in the metal sheet that is embedded in the resin sheet (b), a micropore portion is formed at a volume fraction of 30% by volume or more with respect to the entire volume of the metal sheet.

CITATION LIST

Patent Document

[Patent Document 1]
Japanese Patent No. 4326001
[Patent Document 2]
Japanese Unexamined Patent Application, First Publication No. 2018-187939
[Patent Document 3]
Japanese Patent No. 5553542

Incidentally, in a laminated panel as described in Patent Document 1, a non-foaming resin layer is stuck with an adhesive and laminated between a metal sheet and a foam resin in order to suppress the peeling of a foam resin layer and the metal sheet, and there is a need for a number of steps of sticking the non-foaming resin with the adhesive and a separate foaming step, which increases the manufacturing costs.

In addition, Patent Document 2 describes a method for manufacturing a sandwich panel by heating and pressurizing the sheet-like core layer having a honeycomb structure and the sheet-like prepregs while pressing the sheet-like core layer and the sheet-like prepregs from the upper surface and the lower surface of the core layer, but a honeycomb material in the core layer of the sandwich panel and the prepregs in cover materials are expensive, and the heating time is also long, which increases both the material costs and the manufacturing costs.

In addition, the laminated panel described in Patent Document 3 is a resin sheet-laminated metal sheet having at least the resin sheet (b) in which a metal sheet is embedded and the steel sheet that is positioned on a surface of the resin sheet (b) opposite to the other surface in contact with the resin sheet (a) sequentially laminated on both surfaces of the resin sheet (a), but there is a need for a step of processing micropores in advance in the metal sheet that is embedded in the resin sheet (b) at a volume fraction of 30% by volume or more with respect to the entire volume of the metal sheet, which makes it difficult to attain the cost reduction of the laminated panel since the cost of the resin sheet (b) that occupies the laminated panel is high.

In addition, the resin sheet-laminated metal sheet of the patent is intended to be applied to automobile external sheets, housings of home electrical appliances, furniture and OA equipment components and thus needs to be strong enough to withstand a bending process or deep drawing process. Therefore, the resin sheet (a), which is the core layer, is flexible and preferably as relatively thin as 0.2 to 1.5 mm in thickness, and the total thickness of the panel is also approximately 3 mm or less. Therefore, this laminated panel is not suitable for applications of laminated panels for building materials, ships and vehicles in which a high load bearing property is required and the thickness of the core layer needs to be at least approximately 5 mm.

SUMMARY OF THE INVENTION

Problems to be Solved by the Invention

The present invention is an invention made in consideration of the above-described problems, and an object of the present invention is to provide a resin film-laminated metal sheet that has a high adhesion strength to core layers of laminated panels and enables the manufacture of inexpensive laminated panels having excellent impact resistance.

Means for Solving the Problem

In order to solve the above-described issues and problems, in the present invention, as a covering material of a laminated panel in which a hard foamed urethane resin is used for the core layer, a resin film-laminated metal sheet having thermoplastic resin films thermally fused to both surfaces of a 0.08 mm or more-thick steel sheet or a 0.15 mm or more-thick aluminum sheet is used. The surface tension of the film on a surface in contact with the hard foamed urethane resin is 50 mN/m or less. Furthermore, the amount of a wax that is present on the surface of the resin film-laminated metal sheet is set to more than 0 mg/m$^2$ and 5.00 mg/m$^2$ or less. That is, when a surface of the thermoplastic resin film opposite to the surface that is fused to the metal sheet is defined as a first surface, the surface tension on the surface that is the first surface (the surface in contact with the hard foamed urethane resin) of at least one thermoplastic resin film is 50 mN/m or less, and the amount of the wax that is present on the surface is set to more than 0 mg/m$^2$ and 5.00 mg/m$^2$ or less. Such a configuration increased the adhesion strength to the core layer of the laminated panel and enabled a laminated panel having excellent impact resistance to be provided at a low cost. The present invention does not include any excess manufacturing step such as heating and pressure-bonding of a prepreg sheet into a honeycomb core layer or the like and is thus capable of providing a laminated panel at a low cost, is excellent in terms of the adhesion strength between the core layer and the covering material and is capable of decreasing a variation in foam sizes in the core layer, which makes it possible to manufacture a laminated panel having high impact resistance at a low cost.

The present invention has been made based on the above-described finding, and the gist thereof is as described below. That is, (1) A resin film-laminated metal sheet according to an aspect of the present invention includes a metal sheet and thermoplastic resin films that are fused to both surfaces of the metal sheet, in which the metal sheet is a steel sheet having a thickness of 0.08 mm or more or an aluminum sheet having a thickness of 0.15 mm or more, and, when a surface of the thermoplastic resin film opposite to a surface that is fused to the metal sheet is defined as a first surface, the surface tension on the first surface in at least one of the thermoplastic resin films is 50 mN/m or less, the surface tension on the surface that is fused to the metal sheet is 36 mN/m or more, and an amount of a wax attached to the first surface is more than 0 mg/m$^2$ and 5.00 mg/m$^2$ or less.

(2) The resin film-laminated metal sheet according to (1), in which, when the resin film-laminated metal sheets are set on an upper surface side and a lower surface side of an injection mold, the mold is filled with a foaming raw material containing a polyisocyanate and a polyol through an injection opening on a lateral side of the mold within 30 seconds while mixing the foaming raw material, and the foaming raw material is held at a pressure of 20 kN/m$^2$ for approximately 30 seconds, thereby forming a foamed polyurethane resin between the resin film-laminated metal sheets, an adhesion strength between the thermoplastic resin film and the metal sheet may be higher than an adhesion strength between the foamed polyurethane resin and the thermoplastic resin film.

(3) A method for manufacturing a resin film-laminated metal sheet according to an aspect of the present invention is a method for manufacturing the resin film-laminated metal sheet according to (1) or (2), in which, after film lamination, a wax is applied in a range of 0.1 mg/m$^2$ or more and 2.0 mg/m$^2$ or less, and then a resin film-laminated metal sheet is threaded using a threading roll having a surface tension of 36 mN/m or more on a surface of the threading roll.

(4) The method for manufacturing a resin film-laminated metal sheet according to (3), in which, before the threading of the resin film-laminated metal sheet, a non-lubricated steel sheet may be threaded 1000 m or more at a rate of 50 m/minute or faster without laminating a film, and then the resin film-laminated metal sheet may be manufactured and threaded.

Effects of the Invention

According to the above-described aspects of the present invention, it is possible to provide a resin film-laminated metal sheet that has a high adhesion strength to core layers of laminated panels and enables the manufacture of inexpensive laminated panels having excellent impact resistance.

EMBODIMENT FOR IMPLEMENTING THE INVENTION

A resin film-laminated metal sheet according to an embodiment of the present invention is a resin film-laminated metal sheet that is used as a covering material of a laminated panel in which a hard foamed urethane resin is used for a core layer, in which a metal sheet that is used in the resin film-laminated metal sheet is a 0.08 mm or more-thick steel sheet or a 0.15 mm or more-thick aluminum sheet, films that are fused to both surfaces of the metal sheet are a thermoplastic resin film, the surface tension of the film on a surface in contact with the hard foamed urethane resin is 50 mN/m or less, and the amount of a wax that is present on the surface of the resin film-laminated metal sheet in contact with the hard foamed urethane resin is more than 0 mg/m$^2$ and 5.00 mg/m$^2$ or less. That is, the resin film-laminated metal sheet according to the embodiment of the present invention includes a metal sheet and thermoplastic resin films that are fused to both surfaces of the metal sheet, the metal sheet is a steel sheet having a thickness of 0.08 mm or more or an aluminum sheet having a thickness of 0.15 mm or more, and, when a surface of the thermoplastic resin film opposite to a surface that is thermally fused to the metal sheet is defined as a first surface, the surface tension on the first surface in at least one of the thermoplastic resin films is 50 mN/m or less, the surface tension on the surface that is fused to the metal sheet is 36 mN/m or more, and an amount of a wax attached to the first surface is more than 0 mg/m² and 5.00 mg/m² or less.

When the resin film-laminated metal sheet according to the embodiment of the present invention is used, the adhesion strength to core layers of laminated panels is high, the corrosion resistance is excellent, and it becomes possible to manufacture laminated panels at a low cost.

Figure 8:
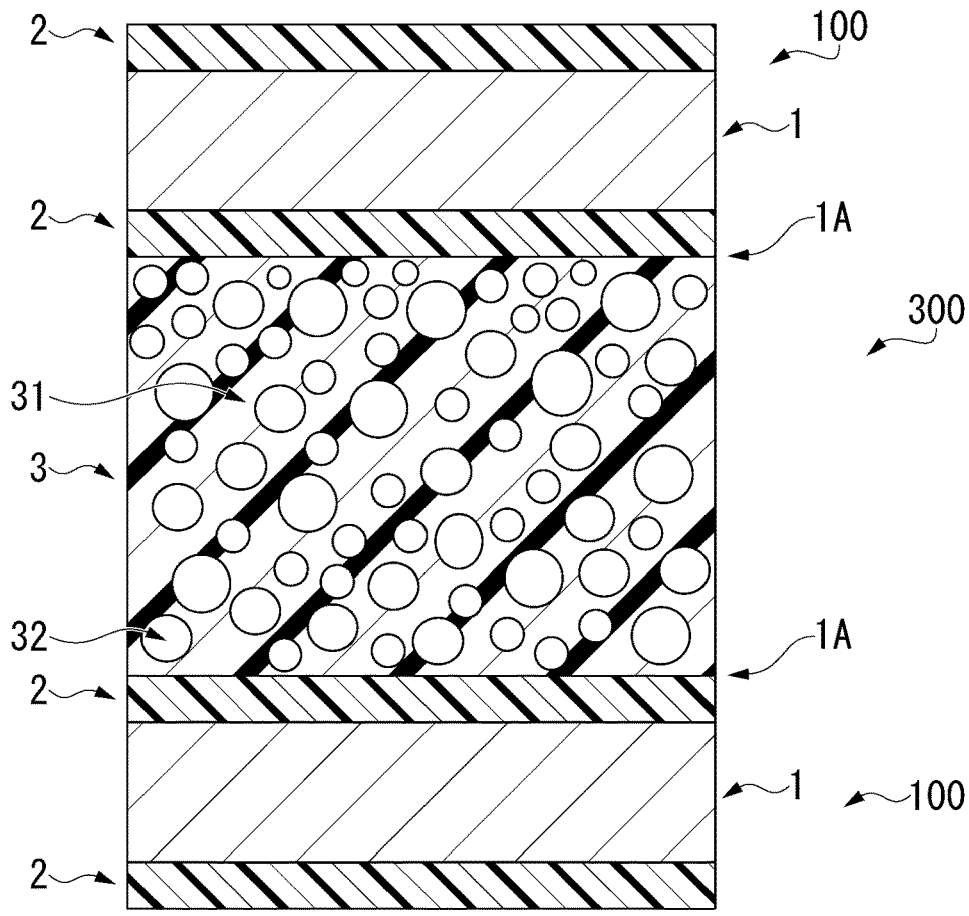
FIG. 8 is a schematic cross-sectional view of a laminated panel in which a resin film-laminated metal sheet according to an aspect of the present invention is used.

Hereinafter, the configuration of the resin film-laminated metal sheet according to the embodiment of the present invention and the configuration of a laminated panel 300 including a resin film-laminated metal sheet 100 will be described using FIG. 8. As shown in FIG. 8, the laminated panel 300 includes a core layer 3 and the resin film-laminated metal sheets 100. Hereinafter, each configuration will be described.

<Laminated Panel>

The laminated panel 300 includes the core layer 3 and the resin film-laminated metal sheets 100. Such a configuration makes the laminated panel 300 lightweight and highly strong.

(Core Layer)

The core layer 3 includes a resin 31 and air bubbles 32. The core layer 3 is preferably composed of a foamed polyurethane resin. The foamed polyurethane resin is particularly preferably a hard foamed polyurethane resin. Here, the hard foamed polyurethane resin refers to a resin foam mainly having a closed-cell structure that is obtained by heating a foaming raw material containing a polyisocyanate having two or more isocyanate groups and a polyol having two or more hydroxyl groups to perform a foaming reaction and a resinifying reaction at the same time. The use of the hard foamed polyurethane resin makes it possible to improve the strength of the laminated panel 300.

(Resin Film-Laminated Metal Sheet)

The resin film-laminated metal sheet 100 includes a metal sheet 1 and thermoplastic resin films 2. Hereinafter, each configuration will be described.

[Metal Sheet]

The metal sheet 1 is excellent in terms of strength, stiffness, processability, adhesion and costs and is thus preferably used in the resin film-laminated metal sheet 100.

Examples of the metal sheet 1 in the resin film-laminated metal sheet 100 according to the embodiment of the present invention include a steel sheet such as a cold-rolled steel sheet, a galvanized steel sheet, a tin-free steel sheet, a tin-plated steel sheet or a nickel-plated steel sheet, an aluminum sheet and a material obtained by performing a surface treatment on the above-described metal sheet. From the viewpoint of adhesion to resins, corrosion resistance, strength and material costs, a cold-rolled steel sheet, a galvanized steel sheet, a tin-free steel sheet and a tin-plated steel sheet are preferable as the metal sheet 1. In particular, since the tin-free steel sheet has a hydrated chromium oxide layer formed in the upper layer of a metallic chromium layer and thus has an extremely high adhesion strength to resins having a polar group capable of forming a hydrogen bond in a molecular chain such as a polyester-based resin, a modified polypropylene resin, a polyamide resin, an ionomer resin or a polyurethane resin, the tin-free steel sheet is preferable as the metal sheet 1.

An adhesion strength as high as that in the tin-free steel sheet can be obtained in the cold-rolled steel sheet and the galvanized steel sheet by performing a variety of chemical conversion treatments such as a phosphate treatment or a chromate treatment thereon for the purpose of improving adhesion. Therefore, in the case of using the cold-rolled steel sheet or the galvanized steel sheet as the metal sheet 1, a cold-rolled steel sheet or galvanized steel sheet on which a chemical conversion treatment has been performed is preferably used.

In the tin-plated steel sheet on which no chemical conversion treatment is performed, tin oxide is present on the plated surface, and a tin oxide layer is likely to peel off in such a state, which makes it impossible to obtain a sufficient adhesion strength. Therefore, it is preferable to prevent the surface from being oxidized by removing tin oxide on the plated surface with a pickling treatment or an alkaline electrolytic treatment and then performing a chemical conversion treatment such as a chromic acid treatment thereon.

The thickness of the metal sheet 1 in the resin film-laminated metal sheet 100 is preferably 0.08 mm or more and 0.8 mm or less in the case of a steel sheet. In a case where the thickness of the steel sheet is less than 0.08 mm, the buckling strength of the laminated panel 300 is not sufficient, and there is a concern that, when a load is locally applied thereto, the metal sheet 1 on the inside may buckles or the metal sheet 1 on the opposite side may crack, which is not preferable. In addition, the upper limit of the thickness of the steel sheet is not particularly limited; however, when reduction in weight is taken into account, it is not preferable to set the sheet thickness to be thicker than necessary. The thickness of the steel sheet is preferably 0.8 mm or less in an economic sense.

In a case where the metal sheet 1 in the resin film-laminated metal sheet 100 is an aluminum sheet, compared with the steel sheet, the specific weight is small, and the weight reduction effect is strong, but the strength is low. Therefore, in the case of using the aluminum sheet, when the thickness of the metal sheet 1 is too thin, the stepping strength of the laminated panel 300 becomes low, and thus the thickness is preferably set to 0.15 mm or more. In the case of using the aluminum sheet, the upper limit of the thickness of the metal sheet 1 is not particularly limited. When reduction in weight is taken into account, it is not preferable to set the thickness of the metal sheet 1 to be thicker than necessary. In an economic sense, in the case of using the aluminum sheet, the thickness of the metal sheet 1 is preferably 2.5 mm or less.

The surface roughness of the metal sheet 1 in the resin film-laminated metal sheet 100 is not particularly limited; however, in a case where the surface roughness of the metal sheet 1 is less than 0.05 μm in terms of the arithmetic average roughness Ra that is regulated by JIS B 0601: 2013, once air bubbles come in through a space between the metal sheet 1 and the thermoplastic film 2 at the time of pressure-bonding and laminating the thermoplastic film 2 on the metal sheet 1, it becomes difficult for the air bubbles to come out, which is not preferable. On the other hand, in a case where the surface roughness of the metal sheet 1 exceeds 0.8 μm in terms of the average roughness Ra, at the time of producing the laminated panel 300, since the fluidity of an urethane resin that is used for the core layer 3 deteriorates, and air bubbles are likely to stay along unevenness on the surface of the metal sheet, the surface roughness of the metal sheet 1 is preferably in a range of 0.05 μm or more and 0.8 μm or less in terms of the average roughness Ra. The surface roughness is more preferably 0.1 μm or more and 0.6 μm or less.

[Thermoplastic Resin Film]

Regarding the thermoplastic resin films 2 that are fused to the metal sheet 1, the surface tension of the thermoplastic resin film 2 on the side on which the thermoplastic resin film 2 is fused to the metal sheet 1 of the resin film-laminated metal sheet 100 is set to 36 mN/m or more. This makes it possible to obtain excellent adhesion to both the metal sheet 1 and the core layer 3.

When the surface tension of the thermoplastic resin film 2 on the surface (first surface 1A) in contact with the hard foamed urethane resin (core layer) 3 exceeds 50 mN/m, the fluidity of the urethane resin that is used for the core layer 3 at the time of producing the laminated panel 300 deteriorates, and there are cases where foamed air bubbles grow locally. In this case, since there is a concern that the bending strength of the laminated panel 300 may decrease, the surface tension of the thermoplastic resin film 2 that is used in the resin film-laminated metal sheet 100, which serves as the covering material of the laminated panel 300, on the surface (first surface 1A) in contact with the hard foamed urethane resin (core layer) 3 is 50 mN/m or less. That is, the surface tension on the first surface of at least one of the thermoplastic resin films in the resin film-laminated metal sheet is 50 mN/m or less.

As a resin thermoplastic resin film that is used as the thermoplastic resin film 2, a film in which a resin having a polar group capable of forming a hydrogen bond in a molecular chain such as a polyester-based resin, a polyamide resin, an ionomer resin or a modified polypropylene resin is used is preferable since such a film is excellent in terms of adhesion to the metal sheet 1 and the resin in the core layer 3. As the thermoplastic resin film 2, in particular, a homo polyethylene terephthalate resin (PET) film, a polyethylene terephthalate/isophthalate copolymer resin (PET-IA) film, and a polyethylene terephthalate/polybutylene terephthalate copolymer resin (PET-PBT) film are preferable.

A native polypropylene-based resin or a polyethylene-based resin has a surface tension of approximately 30 to 32 mN/m and poor adhesion to metal sheets and is thus not preferable. A polypropylene-based film on which a corona treatment has been performed has a higher surface tension than a native polypropylene-based film, but the surface tension is less than 36 mN/m, and adhesion to the metal sheet 1 is not as favorable as that of a modified polypropylene resin, and thus the polypropylene-based film on which a corona treatment has been performed is not preferable.

The thermoplastic film 2 may be a stretched film or a non-stretched film, but is more preferably a stretched film since the fluidity of the urethane resin at the time of producing the laminated panel 300 is more preferable in the stretched film than in the non-stretched film.

In addition, an inorganic filler such as titanium white, silica or carbon black or a pigment for coloration may be added to the thermoplastic film 2. Additionally, an adhesive primer may be applied to the surface of the thermoplastic resin film 2 in order to improve the adhesion to the metal sheet 1 and/or the core layer 3 of the laminated panel 300.

The thickness of the thermoplastic resin film 2 that is fused to the metal sheet 1 is preferably 8 µm or more and 50 µm or less. In a case where the thickness of the film is less than 8 µm, wrinkles are likely to be generated at the time of manufacturing the resin film-laminated metal sheet 100, and, in particular, wrinkles on the thermoplastic resin film 2 that becomes the external surface of the laminated panel 300 are likely to cause poor appearance. For this reason, the thickness of the thermoplastic resin film 2 that becomes the external surface of the laminated panel 300 is preferably 8 µm or more.

On the other hand, when the thickness of the thermoplastic resin film 2 in contact with the core layer 3 exceeds 50

µm, when the resin has been softened by heat generated due to the curing of the urethane resin at the time of manufacturing the laminated panel, the fluidity of the urethane resin deteriorates, and air bubbles are likely to be entrapped. Therefore, the thickness of the thermoplastic resin film 2 on the surface (first surface 1A) in contact with the urethane core layer is preferably set to 50 µm or less.

Ordinarily, a solid-form wax such as a glamour wax or a carnauba wax is applied to the surface of the resin film-laminated metal sheet in order to ensure lubricity during forming. The wax applied to this surface has a low surface tension. Therefore, in a state where more than 5.00 mg/m$^2$ of a wax is present on the surface of the resin film-laminated metal sheet, the peel strength between the resin film-laminated metal sheet and the core layer 3 becomes low in a case where the laminated panel 300 has been produced, which is not preferable. Therefore, the amount of the wax attached to at least the surface of the thermoplastic resin film 2 on the side toward the core layer 3 (first surface 1A) is 5.00 mg/m$^2$ or less. In addition, in a case where the wax on the resin film-laminated metal sheet has been completely removed and the amount of the wax has been made to be 0 mg/m$^2$, at the time of producing the laminated panel 300 in which a hard foamed urethane resin is used for the core layer 3, the sliding property of the surface of the resin film-laminated metal sheet 100 becomes poor in an urethane resin injection step. When the fluidity of the urethane resin in the vicinity of the interface between the urethane resin and the resin film-laminated metal sheet 100 deteriorates, air bubbles gather in a portion where the urethane resin is likely to stay to form a large air bubble. Therefore, the strength and stiffness of the panel are likely to be uneven, which is not preferable. Therefore, the amount of the wax attached to the surface on the side toward the core layer 3 (first surface 1A) is more than 0 mg/m$^2$. The amount of the wax attached is more preferably 0.05 mg/m$^2$ or more.

Therefore, in the resin film-laminated metal sheet 100 according to the embodiment of the present invention, the wax is applied such that the amount of the wax attached to the surface on the side toward the core layer 3 (first surface 1A) of at least one of the thermoplastic resin films 2 reaches more than 0 mg/m$^2$ and 5.00 mg/m$^2$ or less.

The peel strength (adhesion strength) between the thermoplastic resin film 2 and the metal sheet 1 is preferably higher than the peel strength (adhesion strength) between the core layer 3 and the thermoplastic resin film 2. Such a configuration makes it possible for the thermoplastic resin film 2 to firmly cover the metal sheet 1 and makes it possible to prevent rusting of the metal sheet 1.

The adhesion strength between the thermoplastic resin film 2 and the metal sheet 1 is determined to be higher than the adhesion strength between the foamed polyurethane resin and the thermoplastic resin film 2 in the following case. For example, the resin film-laminated metal sheets 100 are set on the upper surface side and the lower surface side of an injection mold, the mold is filled with a foaming raw material containing a polyisocyanate and a polyol through an injection opening on a lateral side of the mold within 30 seconds while mixing the foaming raw material, and the foaming raw material is held at a pressure of 20 kN/m$^2$ for approximately 30 seconds, thereby producing a laminated panel in which a foamed polyurethane resin is formed between the resin film-laminated metal sheets. A 25 mm-wide T-shaped peeling test piece is cut out from the laminated panel, and the resin film-laminated metal sheet is peeled off at a tensile rate of 50 mm/minute, but the film does not peel off from the metal sheet.

[Relationship Between Film Surface Tension and Film Peel Strength]

Next, test results regarding the relationship between the surface tension of the thermoplastic resin film on the surface that is fused to the metal sheet and the film peel strength of the resin film-laminated metal sheet will be described. Hereinafter, the testing method will be specifically described.

[Adjustment of Surface Tension of Thermoplastic Resin Film]

Specimens were prepared by immersing thermoplastic resin films (thermoplastic non-stretched PET-1A films, thickness: 20 μm) in hexane solutions in which the amount of a glamour wax dissolved (0.1 g/L to 5 g/L) was varied, respectively, and naturally drying the thermoplastic resin films. A specimen on which the wax immersion treatment was not performed was prepared. Additionally, an epoxy resin-based primer application diluted with an organic solvent was applied to and dried on the surfaces of the thermoplastic resin films, thereby producing films having a high surface tension.

[Production of Resin Film-Laminated Metal Sheets]

The lamination method of the thermoplastic resin film of the resin film-laminated metal sheet was performed with an exclusive resin film lamination apparatus including a metal sheet supply device, a hot press for metal heating for heating metal sheets, a front and rear-surface film supply device, a heat-resistant lamination roll (the temperature of the surface of a rubber roll is controlled with a metal heating backup roll) and a water tank for cooling. Specifically, thermoplastic films (thermoplastic non-stretched PET-IA films, thickness: 20 μm) each produced with a different amount of a wax attached thereto were thermally fused to metal sheets (tin-free steels (TFS), thickness: 0.185 mm) heated to 265° C. at a linear pressure of 100 N/cm and then immediately cooled with water, thereby producing film-laminated metal sheets.

[Measurement of Film Surface Tension]

The surface tension on the surface that was fused to the metal sheet of the thermoplastic resin film that was used in the resin film-laminated metal sheet was measured by "Plastics-Film and sheeting-Determination of wetting tension" of JIS K 6768: 1999 and determined from the degree of cissing of a liquid mixture for determination of wetting tension (manufactured by FUJIFILM Wako Pure Chemical Corporation).

[Measurement of Film Peel Strength]

The adhesion between the metal sheet and the film of the resin film-laminated metal sheet was evaluated in accordance with an ordinary method for measuring the film peel strengths of film-laminated metal sheets That is, a 180° peeling test piece of a film with a film peeling width of 15 mm was produced, the film was pulled apart at a tensile rate of 20 mm/minute at room temperature, and the 180° peel strength of the film was measured. In a case where the 180° peel strength was 10 N/15 mm or more, the peel strength was evaluated as favorable, in a case where the 180° peel strength was 5 N/15 mm or more and less than 10 N/15, the peel strength was evaluated as acceptable, and, in a case where the 180° peel strength was less than 5 N/15 mm, the peel strength was evaluated as unacceptable (the evaluation was performed based on a film peel strength at which a film does not peel off when a resin film-laminated metal sheet is pulled apart 5 mm by Erichsen bulging). The films that were evaluated as acceptable or favorable were regarded as pass.

Figure 1:
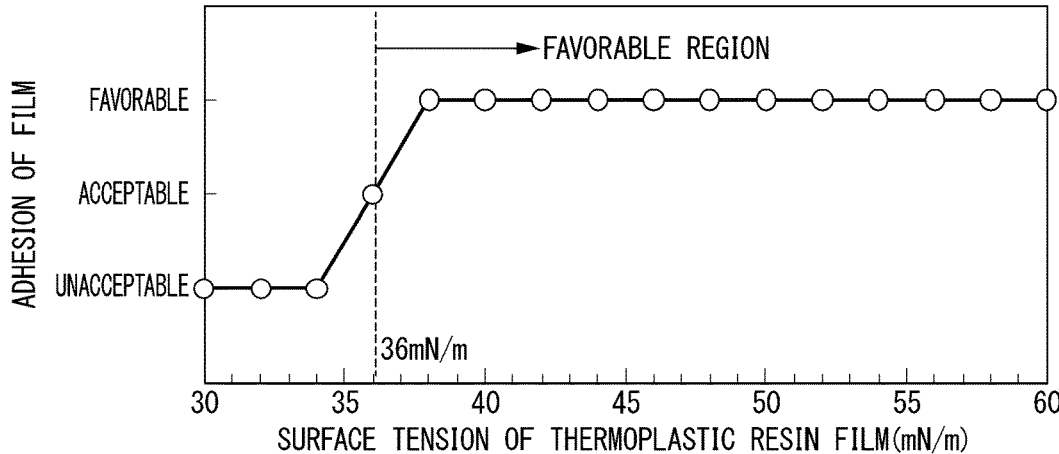
FIG. 1 is a view showing a relationship between the surface tension of a thermoplastic resin film on a surface that is fused to a metal sheet and film adhesion of a resin film-laminated metal sheet.

FIG. 1 is a view showing the relationship between the surface tension of the thermoplastic resin film of the resin film-laminated metal sheet and the film adhesion of the resin film-laminated metal sheet.

As shown in FIG. 1, when the surface tension of the thermoplastic resin film was 36 mN/m or more, the adhesion of the thermoplastic resin film of the resin film-laminated metal sheet was favorable. It was found that, in a case where the surface tension of the film is less than 36 mN/m, the adhesion strength between the metal sheet and the film becomes lower than the adhesion strength to the urethane resin of the laminated panel and there is a concern that the metal sheet and the film may peel off from each other at the interface, which is not preferable.

(Relationship Between Film Surface Tension and Air Bubble Sizes)

Test results regarding the relationship between the surface tension of the thermoplastic resin film on the first surface and the maximum air bubble diameter of air bubbles in the urethane core layer of the laminated panel will be described. Hereinafter, the testing method will be specifically described.

[Adjustment of Surface Tension of Resin Film-Laminated Metal Sheet]

Resin film-laminated metal sheets produced using a thermoplastic resin film to which no wax was attached were each immersed in hexane solutions in which the amount of a glamour wax dissolved (0.1 g/L to 5 g/L) was varied and naturally dried, thereby producing specimens. In addition, a specimen on which the immersion treatment was not performed was also prepared, and resin film-laminated metal sheets having a different amount of the wax attached were prepared.

[Production of Laminated Panels]

Each of the resin film-laminated metal sheets having a surface tension adjusted above was cut into 200 mm×250 mm pieces, the pieces were set on the upper surface side and the lower surface side of an injection mold, and the mold was filled with a foaming raw material containing a polyisocyanate and a polyol through an injection opening on the lateral side of the mold within 30 seconds while mixing the foaming raw material. After that, the foaming raw material was held at a pressure of 20 kN/m² for approximately 30 seconds, the upper and lower molds were then opened, and a laminated panel (core layer: hard foamed urethane resin (specific weight: 0.6), thickness of laminated panel: 5 mm) was removed, thereby obtaining a laminated panel. The configuration of the laminated panel is the resin film-laminated metal sheet, the core layer and the resin film-laminated metal sheet.

[Measurement of Film Surface Tension]

The surface tension on the surface of the resin film-laminated metal sheet that was in contact with the hard foamed urethane resin (core layer) was measured by "Plastics-Film and sheeting-Determination of wetting tension" of JIS K 6768: 1999 and determined from the degree of cissing of a liquid mixture for determination of wetting tension (manufactured by FUJIFILM Wako Pure Chemical Corporation). The surface tensions were measured for resin film-laminated metal sheets having the same amounts of the wax attached as those of the laminated panels.

[Measurement of Air Bubble Sizes in Core Layer]

From the central position of the produced laminated panel, a 15 mm-long and 10 mm-wide test piece was cut and collected with a high-speed precision cutter (FINE CUT SP-320Z manufactured by Heiwa Technica Co., Ltd.), and an embedded polishing specimen of a cross section in an urethane resin injection direction was produced. In the core layer in the produced cross section polishing specimen, three sites of the upper portion, the middle portion and the lower portion of the laminated panel were observed at a magnification of 50 times using a digital optical microscope. The diameters of air bubbles in each layer were measured using the length measurement function of the digital optical microscope, and, among them, the maximum air bubble diameter was obtained. In a case where the maximum air bubble diameter was 200 μm or less, the air bubbles sizes were evaluated as excellent, in a case where the maximum air bubble diameter was 300 μm or less, the air bubbles sizes were evaluated as favorable, in a case where the maximum air bubble diameter was more than 300 μm and 500 μm or less, the air bubbles sizes were evaluated as acceptable, and, in a case where the maximum air bubble diameter was more than 500 μm, the air bubbles sizes were evaluated as unacceptable. The maximum air bubble diameters that were evaluated as acceptable, favorable or excellent were regarded as pass.

Figure 2:
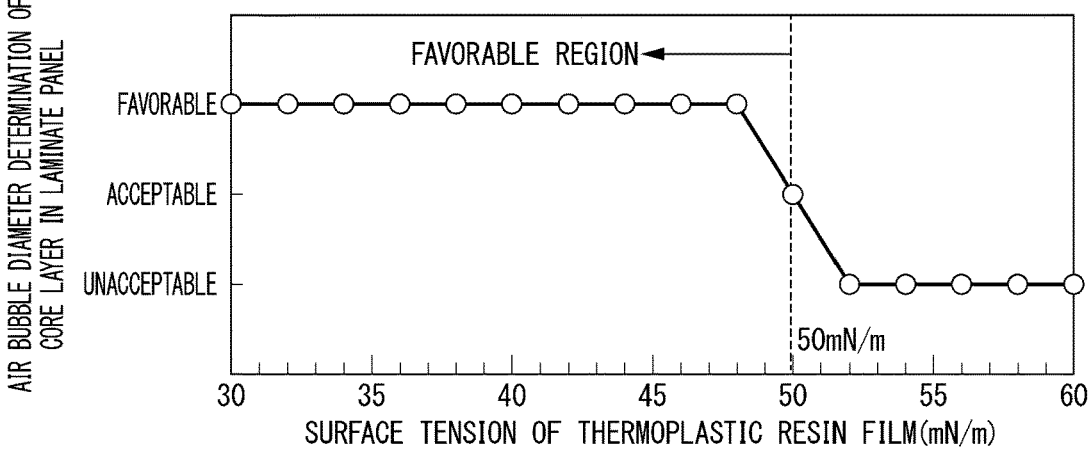
FIG. 2 is a view showing a relationship between the surface tension of the thermoplastic resin film on a surface in contact with a hard foamed urethane resin and a determination result of a maximum air bubble diameter of air bubbles in a core layer of a laminated panel.

FIG. 2 shows the investigation result of the relationship between the surface tension on the film surface of the resin film-laminated metal sheet, which is the covering material, that is in contact with the hard foamed urethane resin (core layer) of the laminated panel and the maximum air bubble diameter of the core layer of the laminated panel.

As is clear from FIG. 2, it was found that, when the surface tension of the thermoplastic film of the resin film-laminated metal sheet that is in contact with the core layer of the laminated panel exceeds 50 mN/m, the maximum air bubble diameter of air bubbles in the core layer of the laminated panel becomes large.

In a case where the thickness of the core layer of the laminated panel is 5 mm or less, and the volume filling factor is approximately 60% or less, if there are a number of air bubbles having a maximum air bubble diameter of more than 500 μm in the core layer, when the laminated panel is bent due to a load applied thereto, there is an increasing possibility that the core layer may buckle and the laminated panel itself may buckle, which is not preferable. As a result of a variety of examinations, it has been clarified that, in a case where the thickness of the core layer is 4 mm, if the maximum air bubble diameter of the air bubbles in the urethane core layer is 500 μm or less, the above-described impact resistance is favorable.

When the surface tension on the surface of the thermoplastic resin film of the resin film-laminated metal sheet that is in contact with the hard foamed urethane resin (core layer) of the laminated panel becomes high, the adhesion to the urethane resin becomes high. However, if the surface tension of the thermoplastic resin film becomes high, when the fluidity of the urethane resin deteriorates, and air bubbles are likely to be drawn at the time of producing the laminated panel, simultaneously, the urethane stays in a portion where the fluidity has deteriorated, and air bubbles are likely to grow. This makes it easy for air bubbles having an air bubble diameter of more than 500 μm to be generated. Therefore, the surface tension on the surface of the thermoplastic resin film of the resin film-laminated metal sheet, which is the covering material, that is in contact with the hard foamed urethane resin (core layer) is preferably set to 50 mN/m or less since the fluidity is improved during the injection of the urethane resin and the sizes of air bubbles can be made small and uniform.

(Relationship Among Amount of Wax Attached, Air Bubble Sizes and Adhesion)

Test results regarding the relationship between the amount of the wax attached to the first surface of the thermoplastic resin film and the maximum air bubble diameter of air bubbles in the core layer of the laminated panel will be described. Hereinafter, the testing method will be specifically described.

[Production of Resin Film-Laminated Metal Sheets for Investigating Amount of Wax Attached and Laminated Panels]

In order to evaluate the adhesion strength of the resin film-laminated metal sheet of the laminated panel of the resin film-laminated metal sheet, hexane solutions (1 to 50 g/L) having a different amount of a glamour wax dissolved were applied using a bar coater to resin film-laminated metal sheets produced under the above-described manufacturing conditions without being immersed in the wax except that the resin film was changed to a stretched homo PET film and the heating temperature of the metal sheet (tin-free steel) during film lamination was set to 285° C. Therefore, resin film-laminated metal sheets having a different amount of the wax attached were produced. Laminated panels were produced under the above-described conditions using the obtained resin film-laminated metal sheets.

[Investigation of Amount of Wax Attached]

The amount of the wax attached was measured as described below. The wax on the surface of a 20 cm×25 cm sample plate (the resin film-laminated metal sheet for investigating the amount of the wax attached that was produced above) was dissolved by applying heptane (approximately 30 ml) thereto. The heptane in which the wax had been dissolved was put into a container (approximately 3 g) produced with an aluminum foil, the weight of which had been measured in advance with a precision scale, and the aluminum foil container was heated with a heater to evaporate the heptane. Again, the weight of the aluminum foil container was measured with the precision scale, and the difference between the weight of the aluminum foil container to which the wax-dissolved heptane solution had been yet to be put in and the weight of the aluminum foil container in which only the wax remained after the evaporation of the heptane was obtained, thereby obtaining the weight of the wax and calculating the amount of the wax attached per unit area.

[Measurement of Air Bubble Sizes in Core Layer]

From the central position of the produced laminated panel, a 15 mm-long and 10 mm-wide test piece was cut and collected with a high-speed precision cutter (FINE CUT SP-320Z manufactured by Heiwa Technica Co., Ltd.), and an embedded polishing specimen of a cross section in an urethane resin injection direction was produced. In the core layer in the produced cross section polishing specimen, air bubbles in individual visual fields at three sites of the upper portion, the middle portion and the lower portion of the laminated panel were observed at a magnification of 50 times using a digital optical microscope. The diameters of the air bubbles in each layer were measured using the length measurement function of the digital optical microscope, and the maximum air bubble diameter was obtained. In a case where the maximum air bubble diameter was 200 μm or less, the air bubbles sizes were evaluated as excellent, in a case where the maximum air bubble diameter was more than 200 μm and 300 μm or less, the air bubbles sizes were evaluated as favorable, in a case where the maximum air bubble diameter was more than 300 μm and 500 μm or less, the air bubbles sizes were evaluated as acceptable, and, in a case where the maximum air bubble diameter was more than 500 μm, the air bubbles sizes were evaluated as unacceptable.

The maximum air bubble diameters that were evaluated as acceptable, favorable or excellent were regarded as pass.
[Measurement of Resin Film-Laminated Metal Sheet Peel Strength of Laminated Panel]

The produced laminated panel was cut with a high-speed precision cutter to collect a 25 mm-wide and 150 mm-long test piece, and the resin film-laminated metal sheets on both surfaces of one test piece end were peeled off approximately 30 mm, thereby producing grip portions for pinching the test piece with chucks of a tensile tester.

The grip portions of the resin film-laminated metal sheets on both surfaces of the test piece were pinched with the chucks of the tensile tester, and the resin film-laminated metal sheet was peeled off 100 mm (the amount of the chucks moved was 200 mm) at a tensile rate of 200 mm/minute, thereby measuring the peel strength between the resin film-laminated metal sheet and the hard foamed urethane resin in the core layer. In a case where the peel strength was 10 N/25 mm or more, the peel strength was evaluated as favorable, in a case where the peel strength was 5 N/25 mm or more and less than 10 N/25 mm, the peel strength was evaluated as acceptable, and, in a case where the peel strength was less than 5 N/25 mm, the peel strength was evaluated as unacceptable. The peel strengths that were evaluated as acceptable or favorable were regarded as pass.

Figure 3:
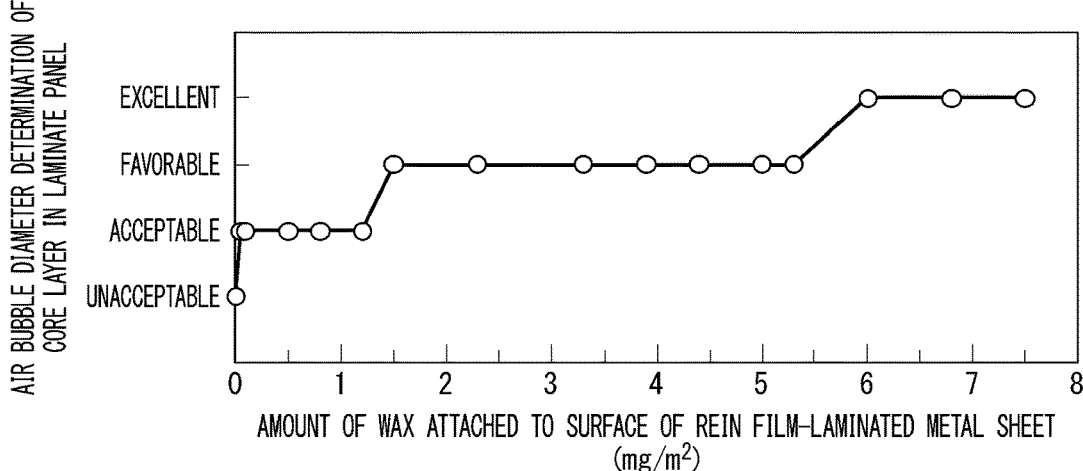
FIG. 3 is a view showing a relationship between an amount of a wax attached to a surface of the resin film-laminated metal sheet and the determination result of the maximum air bubble diameter of the air bubbles in the core layer of the laminated panel.

FIG. 3 is a view showing the relationship between the amount of the wax attached to the surface of the resin film-laminated metal sheet and the determination result of the maximum air bubble diameter of the core layer of the laminated panel when the laminated panel has been produced.

As shown in FIG. 3, it was found that, in the case of a state where no wax is present on the surface of the resin film-laminated metal sheet, the maximum air bubble diameter of the core layer of the laminated panel is likely to become more than 500 μm, which is not preferable.

When no wax is present on the surface of the resin film-laminated metal sheet, the fluidity of the urethane resin in the vicinity of the interface deteriorates in a foam resin injection step during the manufacturing of the laminated panel, a vortex is generated in the vicinity of the interface, and air bubbles are likely to stay and gather. Therefore, a small amount of a wax is preferably present.

Figure 4:
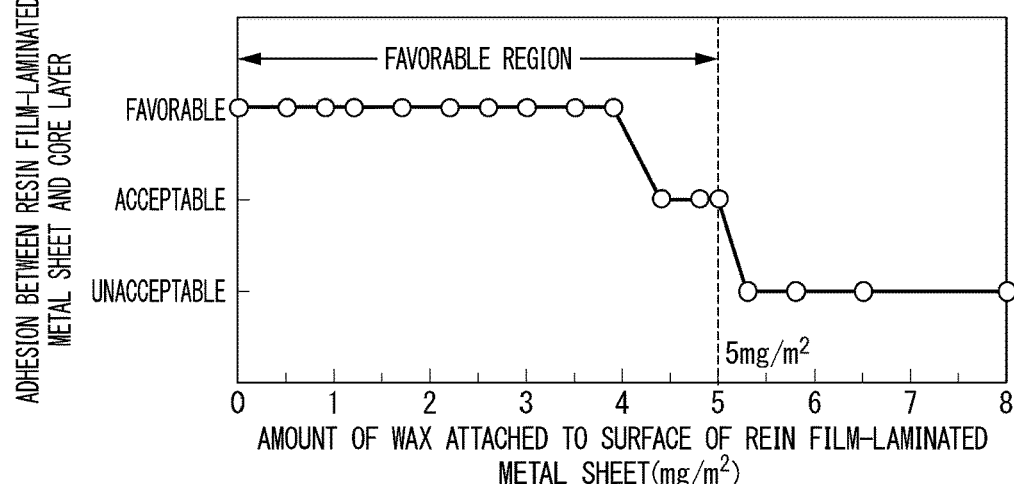
FIG. 4 is a view showing a relationship between the amount of the wax attached to the surface of the resin film-laminated metal sheet and adhesion between the resin film-laminated metal sheet and the core layer.

FIG. 4 is a view showing the relationship between the amount of the wax attached to the surface of the resin film-laminated metal sheet and the adhesion (peel strength) between the film-laminated metal sheet and the core layer when the laminated panel has been produced.

As is clear from FIG. 4, when the amount of the wax attached to the surface of the resin film-laminated metal sheet exceeds 5.00 mg/m$^2$, the peel strength when the laminated panel has been produced becomes lower than 5 N/25 mm, which is the peel strength between the resin film-laminated metal sheet and the core layer required for the laminated panel, which is not preferable.

It has been clarified that, in a case where the amount of the wax attached to the surface of the resin film-laminated metal sheet is more than 0 mg/m$^2$ and 5.00 mg/m$^2$ or less, the peel strength reaches the pass level when the peel strength between the resin film-laminated metal sheet, which is the covering material, and the core layer of the laminated panel when the laminated panel has been produced is 5 N/25 mm or more.
<Method for Manufacturing Resin Film-Laminated Metal Sheet>

Next, a method for manufacturing the resin film-laminated metal sheet 100 will be described. The method for manufacturing the resin film-laminated metal sheet 100 includes a preparation step, a heating step, a lamination step and cooling step.
[Preparation Step]

Figure 9:
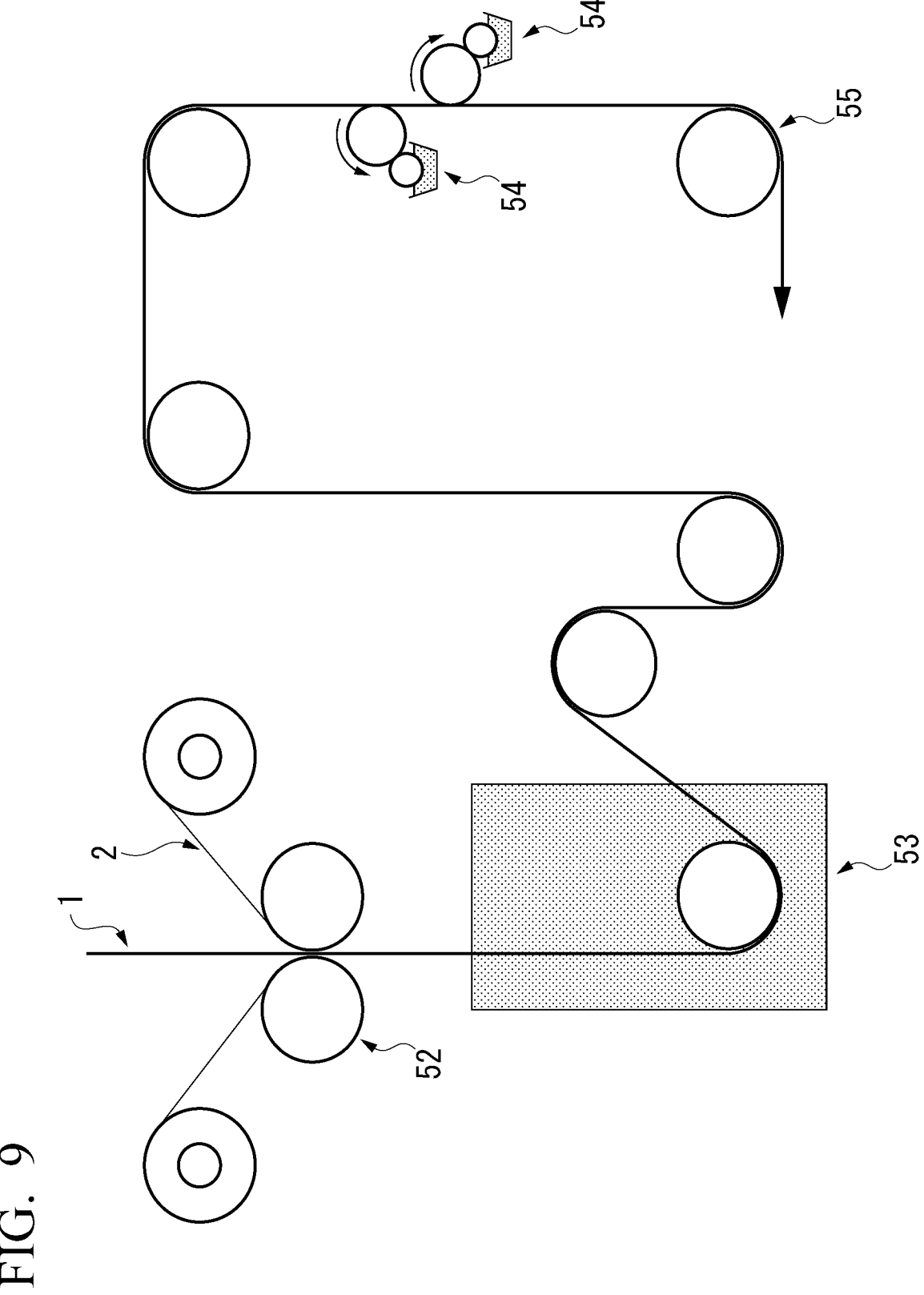
FIG. 9 is a conceptual view of a continuous manufacturing facility of the resin film-laminated metal sheet.

In the related art, in steps of manufacturing a resin film-laminated metal sheet, a thermoplastic resin film is thermally fused to a metal sheet, and then a heated and molten solid-form wax is applied to the surface of the thermoplastic resin film of the resin film-laminated metal sheet with a roll coater 54 (FIG. 9). Therefore, it has not been possible to avoid a small amount of a wax being transferred and deposited on a threading roll 55 (FIG. 9) that is used after a wax application step, and it has been difficult to control the amount of the wax attached to the thermoplastic resin film to be a small amount.

Therefore, the present inventors intensively examined and consequently designed, as a method for controlling the amounts of a wax attached to the surfaces of resin film-laminated metal sheets that are disposed on both sides of a laminated panel to be more than 0 mg/m$^2$ and 5.00 mg/m$^2$ or less, a method in which, before the threading of the resin film-laminated metal sheet of the present application, a non-lubricated steel sheet is threaded, a wax deposited on the surface of a threading roll is removed by being made to be attached to the non-lubricated steel sheet, and then a small amount of a wax is applied and enabled the manufacturing of a resin film-laminated metal sheet in which the amount of a wax attached to the surface of a resin film-laminated metal sheet is more than 0 mg/m$^2$ and 5.00 mg/m$^2$ or less. Here, the non-lubricated steel sheet refers to a steel sheet to which an oil such as a rust preventive oil is not applied.

The present inventors intensively examined threading conditions for obtaining the amount of a wax attached to the surface of a thermoplastic resin films during the manufacturing of a resin film-laminated metal sheet of more than 0 mg/m$^2$ and 5.00 mg/m$^2$ or less and were consequently able to reduce the amount of the wax attached to the surface of the film during the manufacturing of the resin film-laminated metal sheet to more than 0 mg/m$^2$ and 5.00 mg/m$^2$ or less by, in a continuous manufacturing facility of the resin film-laminated metal sheet, threading a non-lubricated steel sheet 1000 m or more at a rate of 50 m/minute or faster without laminating films before the manufacturing of the resin film-laminated metal sheet (preparation step S0) and then applying 0.1 mg/m$^2$ to 2.0 mg/m$^2$ of a wax to the resin film-laminated metal sheet. Specifically, a non-lubricated steel sheet is threaded 1000 m or more at a rate of 50 m/minute or faster without laminating films to remove a wax on the surface of the threading roll 55, the surface tension on the surface of the threading roll 55 is set to 36 mN/m or more, and then 0.1 mg/m$^2$ to 2.0 mg/m$^2$ of a wax is applied to a resin film-laminated metal sheet to thread the resin film-laminated metal sheet, whereby the amount of the wax attached onto the resin film-laminated metal sheet can be reduced to more than 0 mg/m$^2$ and 5.00 mg/m$^2$ or less in the end.

In a case where the threading rate of the non-lubricated steel sheet is slower than 50 m/minute, it is difficult for a shear force to act between the metal sheet and the threading roll, and it becomes difficult to remove the wax attached to the roll at the time of threading the metal sheet, which is not preferable. In addition, in a case where the continuous threading length of the non-lubricated steel sheet is shorter than 1000 in, there are cases where it is not possible to sufficiently remove the wax deposited on the threading roll, which is not preferable.

[Heating Step]

When the wax is removed from the threading roll 55 in the preparation step, the surface tension of the threading roll 55 is set to 36 mN/m or more, then, the thermoplastic resin films 2 are pressure-bonded with film lamination rolls 52 onto a well-known metal sheet 1 heated with a continuous manufacturing facility of a resin film-laminated metal sheet as shown in FIG. 9, for example, a heating roll, which is not shown, to thermally fuse the thermoplastic resin films 2, and then the resin film-laminated metal sheet is cooled to a predetermined temperature in a cooling tank 53, it is possible to form a resin film layer structure that is uniform in the width and length directions and to decrease air bubbles that are drawn between the metal sheet 1 and the thermoplastic resin film 2.

As the method for heating the metal sheet 1 in the continuous manufacturing facility of a resin film-laminated metal sheet in a heating step S1, a method in which the metal sheet is heated by threading the metal sheet through a jacket roll in which the metal sheet is heated by passing a plurality of heat media such as steams through the inside of the roll or a heating roll in which a heater has been built and the like is an exemplary example.

[Lamination Step]

As the film lamination rolls 52 in a lamination step S2, rubber rolls are preferable since it is possible to ensure an appropriate nip length in a film lamination portion. As the material of the rubber roll, highly heat-resistant rubber such as fluororubber or silicon rubber is particularly preferable.

[Cooling Step]

After the films are thermally fused to the metal sheet by the above-described method, the films are cooled in the cooling layer 53. The resin film-laminated metal sheet is preferably cooled to a temperature lower than the crystallization temperature of the thermoplastic resin film 2 (cooling step S3). In the manufacturing method according to the present embodiment, the wax that is applied with the roll coater 54 in FIG. 9 may be applied after being diluted with a solvent to decrease the concentration.

<Method for Manufacturing Laminated Panel>

A method for manufacturing the laminated panel according to the present embodiment is not particularly limited, and the laminated panel can be manufactured by a well-known method. For example, the resin film-laminated metal sheets manufactured by the above-described manufacturing method are set on the upper surface side and the lower surface side of an injection mold, the mold is filled with a foaming raw material containing a polyisocyanate and a polyol through an injection opening on the lateral side of the mold within 30 seconds while mixing the foaming raw material, the foaming raw material is held at a pressure of 20 kN/m² for approximately 30 seconds, and then, the upper and lower molds are opened, whereby the laminated panel can be manufactured.

[Examination on Amount of Wax Attached to Threading Roll]

Next, an examination test of conditions for removing the wax attached to and deposited on the surface of the threading roll 55 of the continuous manufacturing facility, which serves as a wax transfer source to the surface of the resin film-laminated metal sheet, will be described.

Figure 5:
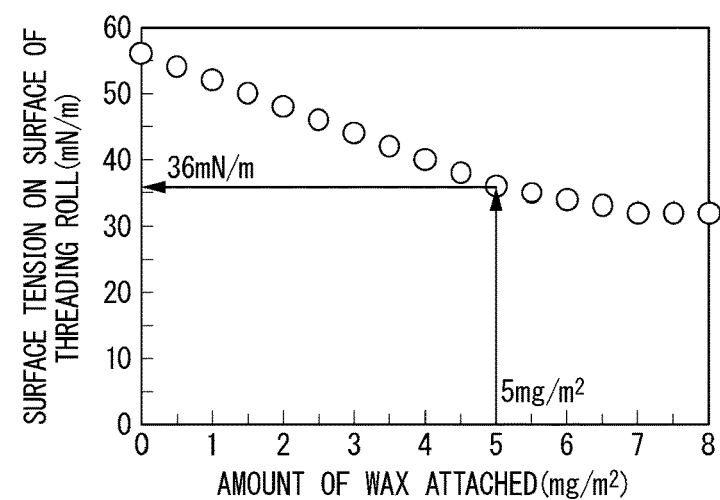
FIG. 5 is a view showing a relationship between an amount of the wax transferred and attached to a surface of the metal sheet threaded a predetermined length and the surface tension on a surface of a threading roll.

FIG. 5 is a view showing the relationship between the measurement result of the surface tension on the surface of the threading roll after the steel sheet has been threaded a predetermined length and the amount of the wax transferred and attached to the surface of the steel sheet at that time. The amount of the wax attached in FIG. 5 was measured by the method performed in the above-described section of the investigation of the amount of the wax attached, and the measurement of the surface tension on the surface of the threading roll was determined based on the cissing properties at the time of applying a surface tension measurement reagent to the surface of the threading roll.

From FIG. 5, it was found that the amount of the wax attached to the surface of the metal sheet after threading in the continuous manufacturing facility of the resin film-laminated metal sheet has a favorable correlation with the surface tension on the surface of the threading roll.

Since the measurement of the surface tension on the surface of the threading roll makes it possible to estimate the amount of the wax attached to the surface after the threading of the resin film-laminated metal sheet, hereinafter, the determination of the removal degree of the wax on the surface of the threading roll was determined based on whether or not cissing occurred after the surface tension measurement reagent having a surface tension of 36 mN/m was applied to the surface of the threading roll.

[Relationship Between Threading Distance and Wax Removal Rate]

Next, steel sheet threading conditions under which the surface tension on the surface of the threading roll in the manufacturing facility of the resin film-laminated metal sheet reaches 36 mN/m or more were examined. First, the relationship between the threading distance and the wax removal rate was investigated. Specifically, a steel sheet (cold-rolled steel sheet, thickness: 0.225 mm) was threaded a threading length that was changed each time at 50 m/minute, a surface tension test solution having a surface tension of 36 mN/m was then applied to the threading roll, and the wax removal degree was determined. In a case where the solution cissing of the surface tension test solution did not occur, the wax removal degree was evaluated as favorable, in a case where instant liquid cissing did not occur, but the solution was drawn within two seconds, the wax removal degree was evaluated as acceptable, and, in a case where the cissing of the solution immediately occurred and the solution turned into water droplet shapes, the wax removal degree was evaluated as unacceptable.

Figure 6:
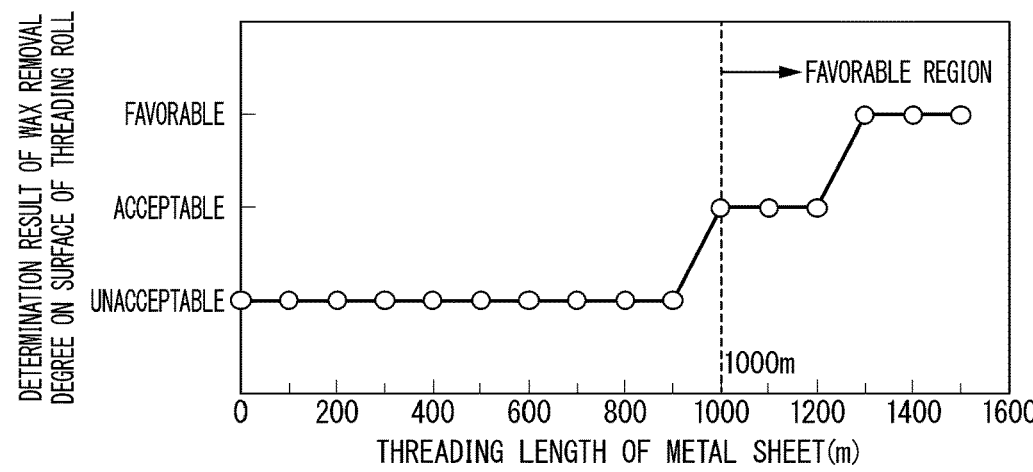
FIG. 6 is a view showing a relationship between a threading length of the metal sheet and a determination result of a wax removal degree on the surface of the threading roll.

FIG. 6 is a view showing the relationship between the threading length at the time of threading the non-lubricated steel sheet at 50 m/minute in the manufacturing facility of the resin film-laminated metal sheet and the result of the wax removal determination on the surface of the threading roll after the threading of the steel sheet.

From FIG. 6, it was found that the threading length of the steel sheet necessary to remove the wax on the surface of the threading roll in a manufacturing line of the resin film-laminated metal sheet is 1000 m or longer and, when the threading length of the steel sheet is shorter than 1000 m, it is not possible to sufficiently remove the wax attached onto the threading roll.

[Relationship Between Threading Rate and Wax Removal Rate]

Next, the relationship between the threading rate and the wax removal rate was investigated. Specifically, a non-lubricated steel sheet (cold-rolled steel sheet, thickness: 0.225 mm) was threaded 1000 m at a threading rate that was changed each time, and then a surface tension test solution having a surface tension of 36 mN/m was applied to the threading roll, thereby determining the wax removal degree. In a case where the solution cissing of the surface tension test solution did not occur, the wax removal degree was evaluated as favorable, in a case where instant liquid cissing did not occur, but the solution was drawn within two seconds, the wax removal degree was evaluated as acceptable, and, in a case where the cissing of the solution immediately occurred and the solution turned into water droplet shapes, the wax removal degree was evaluated as unacceptable.

Figure 7:
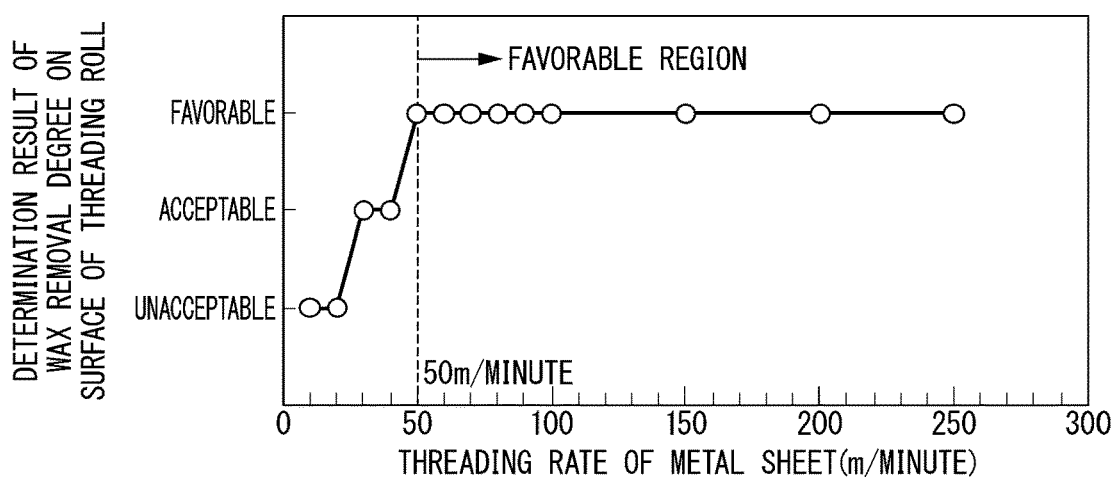
FIG. 7 is a view showing a relationship between a threading rate of the metal sheet and the determination result of the wax removal degree on the surface of the threading roll.

FIG. 7 is a view showing the threading rate of the steel sheet at the time of threading the steel sheet 1000 m in the manufacturing facility of the resin film-laminated metal sheet and the determination result of the wax removal degree on the surface of the threading roll after the threading of the steel sheet.

From FIG. 7, it was found that, in order to remove the wax attached to and deposited on the threading roll at the time of threading the metal sheet 1000 m in order to remove the wax on the surface of the threading roll in the manufacturing line of the resin film-laminated metal sheet, the threading rate of the steel sheet needs to be 50 m/minute or faster and, when the threading rate of the steel sheet is slower than 50 m, it is not possible to sufficiently remove the wax attached onto the threading roll.

This is considered to be because, when the threading rate is slow, a shear force that is exerted on the surface of the threading roll when the steel sheet passes through the threading roll becomes small, and a scraping force when the wax deposited on the surface of the threading roll comes into contact with the steel sheet decreases. In a case where the threading rate of the steel sheet is slower than 50 m, it is conceivable that the wax attached to and deposited on the surface of the threading roll can be removed by increasing the threading length of the steel sheet, but the necessary length of the steel sheet becomes long, and a long time is taken to remove the wax on the surface of the threading roll, which is not preferable in a practical sense.

From FIG. 6 and FIG. 7, it was found that, as the steel sheet threading conditions under which the surface tension on the surface of the threading roll in the manufacturing facility of the resin film-laminated metal sheet reaches 36 mN/m or more, a steel sheet threading rate of 50 m/minute or faster and a steel sheet threading length of 1000 m or longer are required.

EXAMPLES

The resin film-laminated metal sheet for a laminated panel of the present invention and a method for manufacturing the same will be specifically described using examples.

Here, conditions in the examples are conditions adopted to confirm the feasibility and effects of the present invention, and the present invention is not limited to the following examples. It is also possible to add an appropriate modification within a range suitable for the gist and carry out the present invention as long as such a modification does not deviate from the gist of the present invention and the object of the present invention can be achieved. Therefore, in the present invention, a variety of conditions can be adopted, and all of such conditions are included in the technical features of the present invention.

Table 1 shows metal sheets that were used for resin film-laminated metal sheets for laminated panels as shown in FIG. 8 throughout the examples and comparative examples, Table 2 shows thermoplastic resin films in the resin film-laminated metal sheets, and Tables 3A to 3F and Tables 4A to 4F show the resin film-laminated metal sheets, the configuration contents of the laminated panels (the thicknesses of core layers and the densities of resin layers) and the characteristic evaluation results of the laminated panels (the film peel strengths of the resin film-laminated metal sheets, the air bubble size distributions in the core layers, the peel strengths of the resin film-laminated metal sheets of the laminated panels and the impact resistance of the laminated panels). Tables 5A to 5C and Tables 6A to 6C show the configurations of the resin film-laminated metal sheets, conditions for steel sheet threading before the manufacturing of the resin film-laminated metal sheets, the configurations of the core layers in the laminated panels, and the determination results of the resin film-laminated metal sheet peel strengths of the laminated panels. The resin film-laminated metal sheets are continuously manufactured using a continuous manufacturing facility as shown in FIG. 9.

TABLE 1

| Symbol | Metal sheet | Thickness (mm) | Kind of plate/amount of plate | Contents of treatment | Chemical conversion coating | |
| --- | --- | --- | --- | --- | --- | --- |
| | | | | | Kind of coating | Amount attached (mg/m²) |
| M1 | Steel sheet | 0.08 | Metallic Cr: 80 (mg/m²) | Cr anhydride cathode electrolytic treatment (tin-free steel) | Cr oxide/hydroxide | 10 |
| M2 | Steel sheet | 0.80 | Metallic Cr: 80 (mg/m²) | Cr anhydride cathode electrolytic treatment (tin-free steel) | Cr oxide/hydroxide | 10 |
| M3 | Steel sheet | 0.08 | Sn—Fe alloy: 1.0 (g/m²) | Zr fluoride cathode electrolytic treatment | Zr oxide/hydroxide | 5 |
| M4 | Steel sheet | 0.80 | Sn—Fe alloy: 1.0 (g/m²) | Zr fluoride cathode electrolytic treatment | Zr oxide/hydroxide | 5 |
| M5 | Aluminum (A5052) | 0.15 | None | Zr fluoride cathode electrolytic treatment | Zr oxide/hydroxide | 5 |
| M6 | Aluminum (A5052) | 2.50 | None | Zr fluoride cathode electrolytic treatment | Zr oxide/hydroxide | 5 |
| M7 | Steel sheet | 0.07 | Metallic Cr: 80 (mg/m²) | Cr anhydride cathode electrolytic treatment (tin-free steel) | Cr oxide/hydroxide | 8 |
| M8 | Aluminum (A5052) | 0.14 | None | Zr fluoride cathode electrolytic treatment | Zr oxide/hydroxide | 5 |

Underlines indicate that values are outside the scope of the present invention.

TABLE 2

| Symbol | Contents of thermoplastic resin film | Intrinsic viscosity dl/g | Glass transition temperature Tg (° C.) | Crystallization temperature Tc (° C.) | Melting point (° C.) |
|---|---|---|---|---|---|
| E1 | Thermoplastic stretched homo PET film | 0.60 | 70 | 150 | 252 |
| E2 | Thermoplastic stretched homo PET film | 0.60 | 70 | 150 | 252 |
| E3 | Thermoplastic stretched PET-IA film | 0.60 | 68 | 125 | 227 |
| E4 | Thermoplastic stretched PET-IA film | 0.60 | 68 | 125 | 227 |
| E5 | Thermoplastic stretched PET-IA film | 0.60 | 68 | 125 | 227 |
| E6 | Thermoplastic stretched PET-IA film | 0.60 | 68 | 125 | 227 |
| E7 | Thermoplastic stretched PET-IA film | 0.62 | 68 | 125 | 227 |
| E8 | Thermoplastic stretched PET-PBT film | 0.60 | 65 | 150 | 213 |
| E9 | Thermoplastic non-stretched PP film | 0.65 | 65 | 150 | 160 |
| E10 | Thermoplastic non-stretched corona-treated PP film | 0.65 | 65 | 150 | 160 |
| E11 | Thermosetting soft polyurethane film | — | 10 | — | — |
| E12 | thermoplastic non-stretched PET-modified PE coextruded film | 0.65 | — | — | 120, 250 |

| | Surface tension (mN/m) | | Surface roughness Ra (μm) | | |
|---|---|---|---|---|---|
| Symbol | Surface tension on surface that is fused to metal sheet | Surface tension on surface opposite to surface that is fused to metal sheet | Surface roughness on surface that is fused to metal sheet | Surface roughness on surface opposite to surface that is fused to metal sheet | Thickness (μm) |
| E1 | 48 | 48 | 0.2 | 0.2 | 8 |
| E2 | 48 | 48 | 0.2 | 0.2 | 50 |
| E3 | 50 | 50 | 0.2 | 0.2 | 8 |
| E4 | 50 | 50 | 0.2 | 0.2 | 50 |
| E5 | 50 | 50 | 0.2 | 0.2 | 6 |
| E6 | 50 | 50 | 0.2 | 0.2 | 52 |
| E7 | 52 | 52 | 0.3 | 0.3 | 20 |
| E8 | 50 | 50 | 0.2 | 0.2 | 25 |
| E9 | 36 | 36 | 0.2 | 0.2 | 25 |
| E10 | 34 | 34 | 0.3 | 0.3 | 25 |
| E11 | 44 | 44 | 0.3 | 0.3 | 25 |
| E12 | 48 | 36 | 0.1 | 0.1 | 50 |

Underlines indicate that values are outside the scope of the present invention.

TABLE 3A

| | | | | | Configuration and production conditions of resin film-laminated metal sheet (covering material of laminated panel) | | | | |
|---|---|---|---|---|---|---|---|---|---|
| | | | | | | Production conditions of resin film-laminated metal sheet | | | |
| | | Film combination | | | | Threading rate of non-lubricated steel sheet before | Threading length of non-lubricated steel sheet before | Surface tension of threading roll immediately behind roll | Amount of glamour wax |
| Experiment No. | Metal sheet | Film that serves as external surface of panel | Film in contact with core layer | Resin film lamination temperature (° C.) | continuous manufacturing of resin film-laminated metal sheet (m/minute) | continuous manufacturing of resin film-laminated metal sheet (m) | coater of continuous manufacturing facility of resin film-laminate metal sheet (mN/m) | applied to surface of film in contact with core layer (mg/m²) |
| 1 | M1 | E1 | E1 | 270 | 100 | 1000 | 40 | 0.1 |
| 2 | M1 | E2 | E2 | 270 | 100 | 1000 | 40 | 0.1 |
| 3 | M1 | E3 | E3 | 245 | 100 | 1000 | 40 | 0.1 |
| 4 | M1 | E4 | E4 | 245 | 100 | 1000 | 40 | 0.1 |
| 5 | M1 | E5 | E5 | 245 | 100 | 1000 | 40 | 0.1 |
| 6 | M1 | E6 | E6 | 245 | 100 | 1000 | 40 | 0.1 |
| 7 | M1 | E7 | E7 | 245 | 100 | 1000 | 40 | 0.1 |
| 8 | M1 | E8 | E8 | 230 | 100 | 1000 | 40 | 0.1 |
| 9 | M1 | E9 | E9 | 215 | 100 | 1000 | 40 | 0.1 |
| 10 | M1 | E10 | E10 | 215 | 100 | 1000 | 40 | 0.1 |
| 11 | M2 | E1 | E1 | 270 | 100 | 1000 | 40 | 0.1 |
| 12 | M2 | E2 | E2 | 270 | 100 | 1000 | 40 | 0.1 |
| 13 | M2 | E3 | E3 | 245 | 100 | 1000 | 40 | 0.1 |
| 14 | M2 | E4 | E4 | 245 | 100 | 1000 | 40 | 0.1 |
| 15 | M2 | E5 | E5 | 245 | 100 | 1000 | 40 | 0.1 |

TABLE 3A-continued

| | Configuration and production conditions of resin film-laminated metal sheet (covering material of laminated panel) | | Configuration of core layer of laminated panel | | |
|---|---|---|---|---|---|
| Experiment No. | Amount of residual wax on surface of laminated metal sheet on external surface side of laminated panel (mg/m²) | Surface tension on surface that is in contact with core layer (mN/m) | Thickness of core layer (kind of resin: isocyanate, polyol-based two-component fast curing-type hard foamed urethane) (mm) | Density of resin layer (g/cm³) | Distinction between Invention Example and Comparative Example |
| 1 | 0.05 | 48 | 4 | 0.6 | Invention Example |
| 2 | 0.05 | 48 | 4 | 0.6 | Invention Example |
| 3 | 0.05 | 50 | 4 | 0.6 | Invention Example |
| 4 | 0.05 | 50 | 4 | 0.6 | Invention Example |
| 5 | 0.05 | 48 | 4 | 0.6 | Invention Example |
| 6 | 0.05 | 48 | 4 | 0.6 | Invention Example |
| 7 | 0.05 | <u>52</u> | 4 | 0.6 | Comparative Example |
| 8 | 0.05 | 50 | 4 | 0.6 | Invention Example |
| 9 | 0.05 | 36 | 4 | 0.6 | Invention Example |
| 10 | 0.05 | 34 | 4 | 0.6 | Comparative Example |
| 11 | 0.05 | 48 | 4 | 0.6 | Invention Example |
| 12 | 0.05 | 48 | 4 | 0.6 | Invention Example |
| 13 | 0.05 | 50 | 4 | 0.6 | Invention Example |
| 14 | 0.05 | 50 | 4 | 0.6 | Invention Example |
| 15 | 0.05 | 50 | 4 | 0.6 | Inventive Example |

Underlines indicate that values are outside the scope of the present invention.

TABLE 3B

Configuration and production conditions of resin film-laminated metal sheet (covering material of laminated panel)

| | | Film combination | | | Production conditions of resin film-laminated metal sheet | | | |
|---|---|---|---|---|---|---|---|---|
| Experiment No. | Metal sheet | Film that serves as external surface of panel | Film in contact with core layer | Resin film lamination temperature (° C.) | Threading rate of non-lubricated steel sheet before continuous manufacturing of resin film-laminated metal sheet (m/minute) | Threading length of non-lubricated steel sheet before continuous manufacturing of resin film-laminated metal sheet (m) | Surface tension of threading roll immediately behind roll coater of continuous manufacturing facility of resin film-laminated metal sheet (mN/m) | Amount of glamour wax applied to surface of film in contact with core layer (mg/m²) |
| 16 | M2 | E6 | E6 | 245 | 100 | 1000 | 40 | 0.1 |
| 17 | M2 | E7 | <u>E7</u> | 245 | 100 | 1000 | 40 | 0.1 |
| 18 | M2 | E8 | <u>E8</u> | 230 | 100 | 1000 | 40 | 0.1 |
| 19 | M2 | E9 | E9 | 215 | 100 | 1000 | 40 | 0.1 |
| 20 | M2 | E10 | <u>E10</u> | 215 | 100 | 1000 | 40 | 0.1 |
| 21 | M3 | E1 | <u>E1</u> | 265 | 100 | 1000 | 40 | 0.1 |
| 22 | M3 | E2 | E2 | 270 | 100 | 1000 | 40 | 0.1 |
| 23 | M3 | E3 | E3 | 245 | 100 | 1000 | 40 | 0.1 |
| 24 | M3 | E4 | E4 | 265 | 100 | 1000 | 40 | 0.1 |
| 25 | M3 | E5 | E5 | 265 | 100 | 1000 | 40 | 0.1 |
| 26 | M3 | E6 | E6 | 265 | 100 | 1000 | 40 | 0.1 |
| 27 | M3 | E7 | <u>E7</u> | 265 | 100 | 1000 | 40 | 0.1 |
| 28 | M3 | E8 | <u>E8</u> | 265 | 100 | 1000 | 40 | 0.1 |
| 29 | M3 | E9 | E9 | 215 | 100 | 1000 | 40 | 0.1 |
| 30 | M3 | E10 | <u>E10</u> | 265 | 100 | 1000 | 40 | 0.1 |

| | Configuration and production conditions of resin film-laminated metal sheet (covering material of laminated panel) | | Configuration of core layer of laminated panel | | |
|---|---|---|---|---|---|
| Experiment No. | Amount of residual wax on surface of laminated metal sheet on external surface side of laminated panel (mg/m²) | Surface tension on surface that is in contact with core layer (mN/m) | Thickness of core layer (kind of resin: isocyanate, polyol-fast curing-type hard foamed urethane) (mm) | Density of resin layer (g/cm³) | Distinction between Invention Example and Comparative Example |
| 16 | 0.05 | 50 | 4 | 0.6 | Invention Example |
| 17 | 0.05 | <u>52</u> | 4 | 0.6 | Comparative Example |

TABLE 3B-continued

| | | | | | |
|---|---|---|---|---|---|
| 18 | 0.05 | 50 | 4 | 0.6 | Invention Example |
| 19 | 0.05 | 36 | 4 | 0.6 | Invention Example |
| 20 | 0.05 | 34 | 4 | 0.6 | Comparative Example |
| 21 | 0.05 | 48 | 4 | 0.6 | Invention Example |
| 22 | 0.05 | 48 | 4 | 0.6 | Invention Example |
| 23 | 0.05 | 50 | 4 | 0.6 | Invention Example |
| 24 | 0.05 | 50 | 4 | 0.6 | Invention Example |
| 25 | 0.05 | 50 | 4 | 0.6 | Invention Example |
| 26 | 0.05 | 50 | 4 | 0.6 | Invention Example |
| 27 | 0.05 | <u>52</u> | 4 | 0.6 | Comparative Example |
| 28 | 0.05 | 50 | 4 | 0.6 | Invention Example |
| 29 | 0.05 | 36 | 4 | 0.6 | Invention Example |
| 30 | 0.05 | 34 | 4 | 0.6 | Comparative Example |

Underlines indicate that values are outside the scope of the present invention.

TABLE 3C

Configuration and production condition of resin film-laminated
metal sheet (covering material of laminated panel)

| | | | | | Production conditions of resin film-laminated metal sheet | | | |
|---|---|---|---|---|---|---|---|---|
| | | Film combination | | | Threading rate of non-lubricated steel sheet before continuous manufacturing of resin film-laminated metal sheet (m/minute) | Threading length of non-lubricated steel sheet before continuous manufacturing of resin film-laminated metal sheet (m) | Surface tension of threading roll immediately behind roll coater of continuous manufacturing facility of resin film-laminated metal sheet (mN/m) | Amount of glamour wax applied to surface of film in contact with core layer (mg/m²) |
| Experiment No. | Metal sheet | Film that serves as external surface of panel | Film in contact with core layer | Resin film lamination temperature (° C.) | | | | |
| 31 | M4 | E1 | E1 | 270 | 100 | 1000 | 40 | 0.1 |
| 32 | M4 | E2 | E2 | 270 | 100 | 1000 | 40 | 0.1 |
| 33 | M4 | E3 | E3 | 245 | 100 | 1000 | 40 | 0.1 |
| 34 | M4 | E4 | E4 | 345 | 100 | 1000 | 40 | 0.1 |
| 35 | M4 | E5 | E5 | 245 | 100 | 1000 | 40 | 0.1 |
| 36 | M4 | E6 | E6 | 245 | 100 | 1000 | 40 | 0.1 |
| 37 | M4 | E7 | <u>E7</u> | 245 | 100 | 1000 | 40 | 0.1 |
| 38 | M4 | E6 | <u>E8</u> | 230 | 100 | 1000 | 40 | 0.1 |
| 39 | M4 | E9 | E9 | 215 | 100 | 1000 | 40 | 0.1 |
| 40 | M4 | E10 | <u>E10</u> | 215 | 100 | 1000 | 40 | 0.1 |
| 41 | M5 | E1 | <u>E1</u> | 270 | 100 | 1000 | 40 | 0.1 |
| 42 | M5 | E2 | E2 | 270 | 100 | 1000 | 40 | 0.1 |
| 43 | M5 | E3 | E3 | 245 | 100 | 1000 | 40 | 0.1 |
| 44 | M5 | E4 | E4 | 245 | 100 | 1000 | 40 | 0.1 |
| 45 | M5 | E5 | E5 | 245 | 100 | 1000 | 40 | 0.1 |

| | Configuration and production condition of resin film-laminated metal sheet (covering material of laminated panel) | | Configuration of core layer of laminated panel | | |
|---|---|---|---|---|---|
| Experiment No. | Amount of residual wax on surface of laminated metal sheet on external surface side of laminated panel (mg/m²) | Surface tension on surface that is in contact with core layer (mN/m) | Thickness of core layer (kind of resin: isocyanate, polyol-based two-component fast curing-type hard foamed urethane) (mm) | Density of resin layer (g/cm³) | Distinction between Invention Example and Comparative Example |
| 31 | 0.05 | 48 | 4 | 0.6 | Invention Example |
| 32 | 0.05 | 48 | 4 | 0.6 | Invention Example |
| 33 | 0.05 | 50 | 4 | 0.6 | Invention Example |
| 34 | 0.05 | 50 | 4 | 0.6 | Invention Example |
| 35 | 0.05 | 50 | 4 | 0.6 | Invention Example |
| 36 | 0.05 | 50 | 4 | 0.6 | Invention Example |
| 37 | 0.05 | <u>52</u> | 4 | 0.6 | Comparative Example |
| 38 | 0.05 | <u>50</u> | 4 | 0.6 | Invention Example |
| 39 | 0.05 | 36 | 4 | 0.6 | Invention Example |
| 40 | 0.05 | 34 | 4 | 0.6 | Comparative Example |
| 41 | 0.05 | 48 | 4 | 0.6 | Invention Example |
| 42 | 0.05 | 48 | 4 | 0.6 | Invention Example |

TABLE 3C-continued

| 43 | 0.05 | 50 | 4 | 0.6 | Invention Example |
| 44 | 0.05 | 50 | 4 | 0.6 | Invention Example |
| 45 | 0.03 | 50 | 4 | 0.6 | Invention Example |

Underlines indicate that values are outside the scope of the present invention.

TABLE 3D

Configuration and production conditions of resin film-laminated metal sheet (covering material of laminated panel)

| | | Film combination | | | Production conditions of resin film-laminated metal sheet | | | |
| | | | | | Threading rate of non-lubricated steel sheet before continuous | Threading rate of non-lubricated steel sheet before continuous | Surface tension of threading roll immediately behind roll coater of continuous manufacturing | Amount of glamour wax applied to surface |
| Experiment No. | Metal sheet | Film that serves as external surface of panel | Film in contact with core layer | Resin film lamination temperature (° C.) | manufacturing of resin film-laminated metal sheet (m/minute) | manufacturing of resin film-laminated metal sheet (m) | facility of resin film-laminated metal sheet (mN/m) | of film in contact with core layer (mg/m²) |
|---|---|---|---|---|---|---|---|---|
| 46 | M5 | E6 | E6 | 245 | 100 | 1000 | 40 | 0.1 |
| 47 | M5 | E7 | E7 | 245 | 100 | 1000 | 40 | 0.1 |
| 48 | M5 | E8 | E8 | 230 | 100 | 1000 | 40 | 0.1 |
| 49 | M5 | E9 | E9 | 215 | 100 | 1000 | 40 | 0.1 |
| 50 | M5 | E10 | E10 | 215 | 100 | 1000 | 40 | 0.1 |
| 51 | M6 | E1 | E1 | 270 | 100 | 1000 | 40 | 0.1 |
| 52 | M6 | E2 | E2 | 270 | 100 | 1000 | 40 | 0.1 |
| 53 | M6 | E3 | E3 | 245 | 100 | 1000 | 40 | 0.1 |
| 54 | M6 | E4 | E4 | 245 | 100 | 1000 | 40 | 0.1 |
| 55 | M6 | E5 | E5 | 2452 | 100 | 1000 | 40 | 0.1 |
| 56 | M6 | E6 | E6 | 45 | 100 | 1000 | 40 | 0.1 |
| 57 | M6 | E7 | E7 | 245 | 100 | 1000 | 40 | 0.1 |
| 58 | M6 | E8 | E8 | 230 | 100 | 1000 | 40 | 0.1 |
| 59 | M6 | E9 | E9 | 215 | 100 | 1000 | 40 | 0.1 |
| 60 | M6 | E10 | E10 | 215 | 100 | 1000 | 40 | 0.1 |

| | Configuration and production conditions of resin film-laminated metal sheet (covering material of laminated panel) | | Configuration of core layer of laminated panel | | |
| Experiment No. | Amount of residual wax on surface of laminated metal sheet on external surface side of laminated panel (mg/m²) | Surface tension on surface that is in contact with core layer (mN/m) | Thickness of core layer (kind of resin isocyanate, polyol-based two-component fast curing-type hard foamed urethane) (mm) | Density of resin layer (g/cm³) | Distinction between Invention Example and Comparative Example |
|---|---|---|---|---|---|
| 46 | 0.05 | 50 | 4 | 0.6 | Invention Example |
| 47 | 0.05 | 52 | 4 | 0.6 | Comparative Example |
| 48 | 0.05 | 50 | 4 | 0.6 | Invention Example |
| 49 | 0.05 | 36 | 4 | 0.6 | Invention Example |
| 50 | 0.05 | 34 | 4 | 0.6 | Comparative Example |
| 51 | 0.05 | 48 | 4 | 0.6 | Invention Example |
| 52 | 0.05 | 48 | 4 | 0.6 | Invention Example |
| 53 | 0.05 | 50 | 4 | 0.6 | Invention Example |
| 54 | 0.05 | 50 | 4 | 0.6 | Invention Example |
| 55 | 0.05 | 50 | 4 | 0.6 | Invention Example |
| 56 | 0.05 | 50 | 4 | 0.6 | Invention Example |
| 57 | 0.05 | 52 | 4 | 0.6 | Comparative Example |
| 58 | 0.05 | 50 | 4 | 0.6 | Invention Example |
| 59 | 0.05 | 36 | 4 | 0.6 | Invention Example |
| 60 | 0.05 | 34 | 4 | 0.6 | Comparative Example |

Underlines indicate that values are outside the scope of the present invention.

TABLE 3E

Configuration and production conditions of resin film-laminated metal sheet (covering material of laminated panel)

| | | Film combination | | | Production conditions of resin film-laminated metal sheet | | | |
|---|---|---|---|---|---|---|---|---|
| Experiment No. | Metal sheet | Film that serves as external surface of panel | Film in contact with core layer | Resin film lamination temperature (°C) | Threading rate of non-lubricated steel sheet before continuous manufacturing of resin film-laminated metal sheet (m/minute) | Threading rate of non-lubricated steel sheet before continuous manufacturing of resin film-laminated metal sheet (m) | Surface tension of threading roll immediately behind roll coater of continuous manufacturing facility of resin film-laminated metal sheet (mN/m) | Amount of glamour wax applied to surface of film in contact with core layer (mg/m²) |
| 61 | M7 | E1 | E1 | 270 | 100 | 1000 | 40 | 0.1 |
| 62 | M | E9 | E9 | 215 | 100 | 1000 | 40 | 0.1 |
| 63 | M | E1 | E1 | 270 | 100 | 1000 | 40 | 0.1 |
| 64 | M | E9 | E9 | 215 | 100 | 1000 | 40 | 0.1 |
| 65 | M | E1 | E1 | 270 | 100 | 1000 | 40 | 0.0 |
| 66 | M | E1 | E1 | 270 | 100 | 1000 | 40 | 2.0 |
| 67 | M | E1 | E1 | 270 | 100 | 1000 | 40 | <u>2.2</u> |
| 68 | M | E1 | E1 | 270 | 100 | 1000 | 40 | <u>2.5</u> |
| 69 | M | E1 | E1 | 270 | 100 | 1000 | 40 | 0.0 |
| 70 | M | E1 | E1 | 270 | 100 | 1000 | 40 | 2.0 |
| 71 | M | E1 | E1 | 270 | 100 | 1000 | 40 | <u>2.2</u> |
| 72 | M | E1 | E1 | 270 | 100 | 1000 | 40 | <u>2.5</u> |
| 73 | M | E11 | E11 | 250 | 100 | 1000 | 40 | 0.1 |
| 74 | M | E4 | E4 | 240 | 100 | 1000 | 40 | 0.1 |
| 75 | M | E7 | E9 | 240 | 100 | 1000 | 40 | 0.1 |

| | Configuration and production conditions of resin film-laminated metal sheet (covering material of laminated panel) | | Configuration of core layer of laminated panel | | |
|---|---|---|---|---|---|
| Experiment No. | Amount of residual wax on surface of laminated metal sheet on external surface side of laminated panel (mg/m²) | Surface tension on surface that is in contact with core layer (mN/m) | Thickness of core layer (kind of resin isocyanate, polyol-based two-component fast curing-type hard foamed urethane) (mm) | Density of resin layer (g/cm³) | Distinction between Invention Example and Comparative Example |
| 61 | 0.05 | 48 | 4 | 0.6 | Comparative Example |
| 62 | 0.05 | 36 | 4 | 0.6 | Comparative Example |
| 63 | 0.05 | 48 | 4 | 0.6 | Comparative Example |
| 64 | 0.05 | 36 | 4 | 0.6 | Comparative Example |
| 65 | <u>0.00</u> | 48 | 4 | 0.6 | Comparative Example |
| 66 | 5.00 | 48 | 4 | 0.6 | Invention Example |
| 67 | <u>5.20</u> | 48 | 4 | 0.6 | Comparative Example |
| 68 | <u>6.50</u> | 48 | 4 | 0.6 | Comparative Example |
| 69 | <u>0.00</u> | 48 | 4 | 0.6 | Comparative Example |
| 70 | 4.80 | 48 | 4 | 0.6 | Invention Example |
| 71 | <u>5.10</u> | 48 | 4 | 0.6 | Comparative Example |
| 72 | <u>6.60</u> | 48 | 4 | 0.6 | Comparative Example |
| 73 | 0.05 | 44 | 4 | 0.6 | Invention Example |
| 74 | 0.05 | 50 | 4 | 0.6 | Invention Example |
| 75 | 0.05 | 36 | 4 | 0.6 | Invention Example |

Underlines indicate that values are outside the scope of the present invention.

TABLE 3F

Configuration and production conditions of resin film-laminated metal sheet (covering material of laminated panel)

| Experiment No. | Metal sheet | Film combination | | Resin film lamination temperature (° C.) | Production conditions of resin film-laminated metal sheet | | | |
|---|---|---|---|---|---|---|---|---|
| | | Film that serves as external surface of panel | Film in contact with core layer | | Threading rate of non-lubricated steel sheet before continuous manufacturing of resin film-laminated metal sheet (m/minute) | Threading rate of non-lubricated steel sheet before continuous manufacturing of resin film-laminated metal sheet (m) | Surface tension of threading roll immediately behind roll coater of continuous manufacturing facility of resin film-laminated metal sheet (mN/m) | Amount of glamour wax applied to surface of film in contact with core layer (mg/m$^2$) |
| 76 | M | E1 | E7 | 270 | 100 | 1000 | 40 | 0.1 |
| 77 | M | E4 | E9 | 240 | 100 | 1000 | 40 | 0.1 |
| 78 | M | E7 | E11 | 240 | 100 | 1000 | 40 | 0.1 |
| 79 | M | E1 | E7 | 270 | 100 | 1000 | 40 | 0.1 |
| 80 | M | E4 | E9 | 240 | 100 | 1000 | 40 | 0.1 |
| 81 | M | E7 | E9 | 240 | 100 | 1000 | 40 | 0.1 |
| 82 | M | E1 | E7 | 270 | 100 | 1000 | 40 | 0.1 |
| 83 | M | E4 | E9 | 240 | 100 | 1000 | 40 | 0.1 |
| 84 | M | E7 | E9 | 240 | 100 | 1000 | 40 | 0.1 |
| 85 | M | E1 | E7 | 270 | 100 | 1000 | 40 | 0.1 |
| 86 | M | E2 | E9 | 240 | 100 | 1000 | 40 | 0.1 |
| 87 | M | E7 | E9 | 240 | 100 | 1000 | 40 | 0.1 |
| 88 | M | E1 | E7 | 270 | 100 | 1000 | 40 | 0.1 |
| 89 | M | E4 | E9 | 240 | 100 | 1000 | 40 | 0.1 |
| 90 | M | E7 | E9 | 240 | 100 | 1000 | 40 | 0.1 |
| 91 | M | E1 | E7 | 270 | 100 | 1000 | 40 | 0.1 |
| 92 | M | E1 | E7 | 270 | 100 | 1000 | 40 | 0.1 |
| 93 | M | E12 | P12 | 270 | 100 | 1000 | 40 | 0.1 |
| 94 | M | E12 | P12 | 270 | 100 | 1000 | 40 | 0.1 |

| Experiment No. | Configuration and production conditions of resin film-laminated metal sheet (covering material of laminated panel) | | Configuration of core layer of laminated panel | | |
|---|---|---|---|---|---|
| | Amount of residual wax on surface of laminated metal sheet on external surface side of laminated panel (mg/m$^2$) | Surface tension on surface that is in contact with core layer (mN/m) | Thickness of core layer (kind of resin isocyanate, polyol-based two-component fast curing-type hard foamed urethane) (mm) | Density of resin layer (g/cm$^3$) | Distinction between Invention Example and Comparative Example |
| 76 | 0.05 | 52 | 4 | 0.6 | Comparative Example |
| 77 | 0.05 | 36 | 4 | 0.6 | Invention Example |
| 78 | 0.05 | 44 | 4 | 0.6 | Invention Example |
| 79 | 0.05 | 52 | 4 | 0.6 | Comparative Example |
| 80 | 0.05 | 36 | 4 | 0.6 | Invention Example |
| 81 | 0.05 | 36 | 4 | 0.6 | Invention Example |
| 82 | 0.05 | 52 | 4 | 0.6 | Comparative Example |
| 83 | 0.05 | 36 | 4 | 0.6 | Invention Example |
| 84 | 0.05 | 36 | 4 | 0.6 | Invention Example |
| 85 | 0.05 | 52 | 4 | 0.6 | Comparative Example |
| 86 | 0.05 | 36 | 4 | 0.6 | Invention Example |
| 87 | 0.05 | 36 | 4 | 0.6 | Invention Example |
| 88 | 0.05 | 52 | 4 | 0.6 | Comparative Example |
| 89 | 0.05 | 36 | 4 | 0.6 | Invention Example |
| 90 | 0.05 | 36 | 4 | 0.6 | Invention Example |
| 91 | 0.05 | 52 | 4 | 0.6 | Comparative Example |
| 92 | 0.05 | 48 | 4 | 0.6 | Comparative Example |
| 93 | 0.05 | 36 | 4 | 0.6 | Invention Example |
| 94 | 0.05 | 36 | 4 | 0.6 | Invention Example |

Underlines indicate that values are outside the scope of the present invention

TABLE 4A

| | Characteristic determination results of resin metal laminated panels | | | | | |
|---|---|---|---|---|---|---|
| | Determination results of film peel strength of resin film-laminated metal sheet | | Determination results of air | Determination results of peel strength of resin | Determination | Distinction between Invention |
| Experiment No. | Film that serves as external surface of panel | Film in contact with core layer | bubble size distribution in core layer | film-laminated metal sheet of laminated panel | results of impact resistance of laminated panel | Example and Comparative Example |
| 1 | Favorable | Favorable | Favorable | Favorable | Favorable | Invention Example |
| 2 | Favorable | Favorable | Acceptable | Favorable | Favorable | Invention Example |
| 3 | Favorable | Favorable | Favorable | Favorable | Favorable | Invention Example |
| 4 | Favorable | Favorable | Acceptable | Favorable | Favorable | Invention Example |
| 5 | Favorable | Favorable | Favorable | Acceptable | Acceptable | Invention Example |
| 6 | Favorable | Favorable | Acceptable | Acceptable | Acceptable | Invention Example |
| 7 | Favorable | Favorable | <u>Unacceptable</u> | Acceptable | <u>Unacceptable</u> | Comparative Example |
| 8 | Favorable | Favorable | Acceptable | Favorable | Favorable | Invention Example |
| 9 | Acceptable | Acceptable | Excellent | Acceptable | Acceptable | Invention Example |
| 10 | <u>Unacceptable</u> | <u>Unacceptable</u> | Excellent | <u>Unacceptable</u> | <u>Unacceptable</u> | Comparative Example |
| 11 | Favorable | Favorable | Favorable | Favorable | Favorable | Invention Example |
| 12 | Favorable | Favorable | Acceptable | Favorable | Favorable | Invention Example |
| 13 | Favorable | Favorable | Favorable | Favorable | Favorable | Invention Example |
| 14 | Favorable | Favorable | Acceptable | Favorable | Favorable | Invention Example |
| 15 | Favorable | Favorable | Favorable | Acceptable | Acceptable | Invention Example |

Underlines indicate that values are outside the scope of the present invention.

TABLE 4B

| | Characteristic determination results of resin metal laminated panels | | | | | |
|---|---|---|---|---|---|---|
| | Determination results of film peel strength of resin film-laminated metal sheet | | Determination results of air | Determination results of peel strength of resin | Determination results of | Distinction between Invention |
| Experiment No. | Film that serves as external surface of panel | Film in contact with core layer | bubble size distribution in core layer | film-laminated metal sheet of laminated panel | impact resistance of laminated panel | Example and Comparative Example |
| 16 | Favorable | Favorable | Acceptable | Acceptable | Acceptable | Invention Example |
| 17 | Favorable | Favorable | <u>Unacceptable</u> | Acceptable | <u>Unacceptable</u> | Comparative Example |
| 18 | Favorable | Favorable | Acceptable | Favorable | Favorable | Invention Example |
| 19 | Acceptable | Acceptable | Excellent | Acceptable | Favorable | Invention Example |
| 20 | <u>Unacceptable</u> | <u>Unacceptable</u> | Excellent | <u>Unacceptable</u> | <u>Unacceptable</u> | Comparative Example |
| 21 | Favorable | Favorable | Favorable | Favorable | Favorable | Invention Example |
| 22 | Favorable | Favorable | Acceptable | Favorable | Favorable | Invention Example |
| 23 | Favorable | Favorable | Favorable | Favorable | Favorable | Invention Example |
| 24 | Favorable | Favorable | Acceptable | Favorable | Favorable | Invention Example |
| 25 | Favorable | Favorable | Favorable | Acceptable | Acceptable | Invention Example |
| 26 | Favorable | Favorable | Acceptable | Acceptable | Acceptable | Invention Example |
| 27 | Favorable | Favorable | <u>Unacceptable</u> | Acceptable | <u>Unacceptable</u> | Comparative Example |
| 28 | Favorable | Favorable | Acceptable | Favorable | Favorable | Invention Example |
| 29 | Acceptable | Acceptable | Excellent | Acceptable | Acceptable | Invention Example |
| 30 | <u>Unacceptable</u> | <u>Unacceptable</u> | Excellent | <u>Unacceptable</u> | <u>Unacceptable</u> | Comparative Example |

Underlines indicate that values are outside the scope of the present invention.

TABLE 4C

| | Characteristic determination results of resin metal laminated panels | | | | | |
|---|---|---|---|---|---|---|
| | Determination results of film peel strength of resin film-laminated metal sheet | | Determination results of air | Determination results of peel strength of resin | Determination results of | Distinction between Invention |
| Experiment No. | Film that serves as external surface of panel | Film in contact with core layer | bubble size distribution in core layer | film-laminated metal sheet of laminated panel | impact resistance of laminated panel | Example and Comparative Example |
| 31 | Favorable | Favorable | Favorable | Favorable | Favorable | Invention Example |
| 32 | Favorable | Favorable | Acceptable | Favorable | Favorable | Invention Example |

TABLE 4C-continued

| | Characteristic determination results of resin metal laminated panels | | | | | |
|---|---|---|---|---|---|---|
| | Determination results of film peel strength of resin film-laminated metal sheet | | Determination results of air | Determination results of peel strength of resin | Determination results of | Distinction between Invention |
| Experiment No. | Film that serves as external surface of panel | Film in contact with core layer | bubble size distribution in core layer | film-laminated metal sheet of laminated panel | impact resistance of laminated panel | Example and Comparative Example |
| 33 | Favorable | Favorable | Favorable | Favorable | Favorable | Invention Example |
| 34 | Favorable | Favorable | Acceptable | Favorable | Favorable | Invention Example |
| 35 | Favorable | Favorable | Favorable | Acceptable | Acceptable | Invention Example |
| 36 | Favorable | Favorable | Acceptable | Acceptable | Acceptable | Invention Example |
| 37 | Favorable | Favorable | <u>Unacceptable</u> | Acceptable | <u>Unacceptable</u> | Comparative Example |
| 38 | Favorable | Favorable | Acceptable | Favorable | Favorable | Invention Example |
| 39 | Acceptable | Acceptable | Excellent | Acceptable | Favorable | Invention Example |
| 40 | <u>Unacceptable</u> | <u>Unacceptable</u> | Excellent | <u>Unacceptable</u> | <u>Unacceptable</u> | Comparative Example |
| 41 | Favorable | Favorable | Favorable | Favorable | Favorable | Invention Example |
| 42 | Favorable | Favorable | Acceptable | Favorable | Favorable | Invention Example |
| 43 | Favorable | Favorable | Favorable | Favorable | Favorable | Invention Example |
| 44 | Favorable | Favorable | Acceptable | Favorable | Favorable | Invention Example |
| 45 | Favorable | Favorable | Favorable | Acceptable | Acceptable | Invention Example |

Underlines indicate that values are outside the scope of the present invention.

TABLE 4D

| | Characteristic determination results of resin metal laminated panels | | | | | |
|---|---|---|---|---|---|---|
| | Determination results of film peel strength of resin film-laminated metal sheet | | Determination results of air | Determination results of peel strength of resin | Determination results of | Distinction between Invention |
| Experiment No. | Film that serves as external surface of panel | Film in contact with core layer | bubble size distribution in core layer | film-laminated metal sheet of laminated panel | impact resistance of laminated panel | Example and Comparative Example |
| 46 | Favorable | Favorable | Acceptable | Acceptable | Acceptable | Invention Example |
| 47 | Favorable | Favorable | <u>Unacceptable</u> | Acceptable | <u>Unacceptable</u> | Comparative Example |
| 48 | Favorable | Favorable | Acceptable | Favorable | Favorable | Invention Example |
| 49 | Accoptable | Acceptable | Excellent | Acceptable | Acceptable | Invention Example |
| 50 | <u>Unacceptable</u> | <u>Unacceptable</u> | Excellent | <u>Unacceptable</u> | <u>Unacceptable</u> | Comparative Example |
| 51 | Favorable | Favorable | Favorable | Favorable | Favorable | Invention Example |
| 52 | Favorable | Favorable | Acceptable | Favorable | Favorable | Invention Example |
| 53 | Favorable | Favorable | Favorable | Favorable | Favorable | Invention Example |
| 54 | Favorable | Favorable | Acceptable | Favorable | Favorable | Invention Example |
| 55 | Favorable | Favorable | Favorable | Acceptable | Acceptable | Invention Example |
| 56 | Favorable | Favorable | Acceptable | Acceptable | Acceptable | Invention Example |
| 57 | Favorable | Favorable | <u>Unacceptable</u> | Acceptable | <u>Unacceptable</u> | Comparative Example |
| 58 | Favorable | Favorable | Acceptable | Favorable | Favorable | Invention Example |
| 59 | Favorable | Favorable | Excellent | Acceptable | Favorable | Invention Example |
| 60 | <u>Unacceptable</u> | <u>Unacceptable</u> | Excellent | <u>Unacceptable</u> | <u>Unacceptable</u> | Comparative Example |

Underlines indicate that values are outside the scope of the present invention.

TABLE 4E

| | Characteristic determination results of resin metal laminated panels | | | | | |
|---|---|---|---|---|---|---|
| | Determination results of film peel strength of resin film-laminated metal sheet | | Determination results of air | Determination results of peel strength of resin | Determination results of | Distinction between Invention |
| Experiment No. | Film that serves as external surface of panel | Film in contact with core layer | bubble size distribution in core layer | film-laminated metal sheet of laminated panel | impact resistance of laminated panel | Example and Comparative Example |
| 61 | Favorable | Favorable | Favorable | Favorable | <u>Unacceptable</u> | Comparative Example |
| 62 | Acceptable | Acceptable | Excellent | Favorable | <u>Unacceptable</u> | Comparative Example |
| 63 | Favorable | Favorable | Favorable | Favorable | <u>Unacceptable</u> | Comparative Example |
| 64 | Acceptable | Acceptable | Excellent | Favorable | <u>Unacceptable</u> | Comparative Example |
| 65 | Favorable | Favorable | <u>Unacceptable</u> | Favorable | <u>Unacceptable</u> | Comparative Example |

TABLE 4E-continued

| | Determination results of film peel strength of resin film-laminated metal sheet | | Determination results of air | Determination results of peel strength of resin | Determination results of | Distinction between Invention |
|---|---|---|---|---|---|---|
| Experiment No. | Film that serves as external surface of panel | Film in contact with core layer | bubble size distribution in core layer | film-laminated metal sheet of laminated panel | impact resistance of laminated panel | Example and Comparative Example |
| 66 | Favorable | Favorable | Favorable | Acceptable | Acceptable | Invention Example |
| 67 | Favorable | Favorable | Favorable | Unacceptable | Unacceptable | Comparative Example |
| 68 | Favorable | Favorable | Favorable | Unacceptable | Unacceptable | Comparative Example |
| 69 | Favorable | Favorable | Unacceptable | Favorable | Unacceptable | Comparalive Example |
| 70 | Favorable | Favorable | Favorable | Acceptable | Acceptable | Invention Example |
| 71 | Favorable | Favorable | Favorable | Unacceptable | Unacceptable | Comparative Example |
| 72 | Favorable | Favorable | Favorable | Unacceptable | Unacceptable | Comparative Example |
| 73 | Favorable | Acceptable | Favorable | Acceptable | Acceptable | Invention Example |
| 74 | Favorable | Acceptable | Favorable | Acceptable | Acceptable | Invention Example |
| 75 | Favorable | Acceptable | Favorable | Acceptable | Acceptable | Invention Example |

Underlines indicate that values are outside the scope of the present invention.

TABLE 4F

| | Determination results of film peel strength of resin film-laminated metal sheet | | Determination results of air | Determination results of peel strength of resin | Determination results of | Distinction between Invention |
|---|---|---|---|---|---|---|
| Experiment No. | Film that serves as external surface of panel | Film in contact with core layer | bubble size distribution in core layer | film-laminated metal sheet of laminated panel | impact resistance of laminated panel | Example and Comparative Example |
| 76 | Favorable | Favorable | Unacceptable | Acceptable | Unacceptable | Comparative Example |
| 77 | Favorable | Acceptable | Excellent | Acceptable | Acceptable | Invention Example |
| 78 | Favorable | Acceptable | Favorable | Acceptable | Acceptable | Invention Example |
| 79 | Favorable | Favorable | Unacceptable | Acceptable | Unacceptable | Comparative Example |
| 80 | Favorable | Acceptable | Excellent | Acceptable | Acceptable | Invention Example |
| 81 | Favorable | Acceptable | Excellent | Acceptable | Acceptable | Invention Example |
| 82 | Favorable | Favorable | Unacceptable | Acceptable | Unacceptable | Comparative Example |
| 83 | Favorable | Acceptable | Excellent | Acceptable | Acceptable | Invention Example |
| 84 | Favorable | Acceptable | Excellent | Acceptable | Acceptable | Invention Example |
| 85 | Favorable | Favorable | Unacceptable | Acceptable | Unacceptable | Comparative Example |
| 86 | Favorable | Acceptable | Excellent | Acceptable | Acceptable | Invention Example |
| 87 | Favorable | Acceptable | Excellent | Acceptable | Acceptable | Invention Example |
| 88 | Favorable | Favorable | Unacceptable | Acceptable | Unacceptable | Comparative Example |
| 89 | Favorable | Acceptable | Excellent | Acceptable | Acceptable | Invention Example |
| 90 | Favorable | Acceptable | Excellent | Acceptable | Acceptable | Invention Example |
| 91 | Favorable | Favorable | Unacceptable | Acceptable | Unacceptable | Comparative Example |
| 92 | Favorable | Favorable | Unacceptable | Acceptable | Unacceptable | Comparative Example |
| 93 | Favorable | Favorable | Favorable | Acceptable | Acceptable | Invention Example |
| 94 | Favorable | Favorable | Favorable | Acceptable | Favorable | Invention Example |

Underlines indicate that values are outside tl e scope of the present invention.

TABLE 5A

Configuration and production conditions of resin film-laminated metal sheet (covering material of laminated panel)

| | | Film combination | | | Production conditions of resin film-laminated metal sheet | | | |
| | | | | | Threading rate of non-lubricated steel sheet before continuous | Threading rate of non-lubricated steel sheet before continuous | Surface tension of threading roll immediately behind roll coater of continuous | Amount of glamour wax applied to surface |
| Experiment No. | Metal sheet | Film that serves as external surface of panel | Film in contact with core layer | Resin film lamination temperature (° C.) | manufacturing of resin film-laminated metal sheet (m/minute) | manufacturing of resin film-laminated metal sheet (m) | facility of resin film-laminated metal sheet (mN/m) | of film in contact with core layer (mg/m$^2$) |
|---|---|---|---|---|---|---|---|---|
| 95 | M1 | E1 | E1 | 270 | 50 | 1000 | 36 | 2.0 |
| 96 | M1 | E1 | E1 | 270 | <u>40</u> | 1000 | <u>32</u> | 2.0 |
| 97 | M1 | E1 | E1 | 270 | 50 | <u>950</u> | <u>34</u> | 2.0 |
| 98 | M1 | E1 | E1 | 270 | 100 | 1000 | 38 | 2.0 |
| 99 | M2 | E1 | E1 | 270 | 50 | 1000 | 36 | 2.0 |
| 100 | M2 | E1 | E1 | 270 | <u>40</u> | 1000 | <u>32</u> | 2.0 |
| 101 | M2 | E1 | E1 | 270 | 50 | <u>950</u> | <u>34</u> | 2.0 |
| 102 | M2 | E1 | E1 | 270 | 100 | 1000 | 38 | 2.0 |
| 103 | M3 | E1 | E1 | 270 | 50 | 1000 | 36 | 2.0 |
| 104 | M3 | E1 | E1 | 270 | <u>40</u> | 1000 | <u>32</u> | 2.0 |
| 105 | M3 | E1 | E1 | 270 | 50 | <u>950</u> | <u>34</u> | 2.0 |
| 106 | M3 | E1 | E1 | 270 | 100 | 1000 | 38 | 2.0 |
| 107 | M4 | E1 | E1 | 270 | 50 | 1000 | 36 | 2.0 |
| 108 | M4 | E1 | E1 | 270 | <u>40</u> | 1000 | <u>32</u> | 2.0 |
| 109 | M4 | E1 | E1 | 270 | 50 | <u>950</u> | <u>34</u> | 2.0 |
| 110 | M4 | E1 | E1 | 270 | 100 | 1000 | 38 | 2.0 |

| | Configuration and production conditions of resin film-laminated metal sheet (covering material of laminated panel) | | Configuration of core layer of laminated panel | | |
| Experiment No. | Amount of residual wax on surface of laminated metal sheet on external surface side of laminated panel (mg/m$^2$) | Surface tension on surface that is in contact with core layer (mN/m) | Thickness of core layer (kind of resin isocyanate, polyol-based two-component fast curing-type hard foamed urethane) (mm) | Density of resin layer (g/cm$^3$) | Distinction between Invention Example and Comparative Example |
|---|---|---|---|---|---|
| 95 | 5.00 | 36 | 4 | 0.6 | Invention Example |
| 96 | <u>6.00</u> | <u>32</u> | 4 | 0.6 | Comparative Example |
| 97 | <u>6.00</u> | <u>34</u> | 4 | 0.6 | Comparative Example |
| 98 | 3.00 | 40 | 4 | 0.6 | Invention Example |
| 99 | 4.00 | 36 | 4 | 0.6 | Invention Example |
| 100 | <u>6.00</u> | <u>32</u> | 4 | 0.6 | Comparative Example |
| 101 | <u>6.00</u> | <u>34</u> | 4 | 0.6 | Comparative Example |
| 102 | 3.00 | 40 | 4 | 0.6 | Invention Example |
| 103 | 5.00 | 36 | 4 | 0.6 | Invention Example |
| 104 | <u>6.00</u> | <u>32</u> | 4 | 0.6 | Comparative Example |
| 105 | <u>6.00</u> | <u>34</u> | 4 | 0.6 | Comparative Example |
| 106 | 3.00 | 40 | 4 | 0.6 | Invention Example |
| 107 | 4.00 | 36 | 4 | 0.6 | Invention Example |
| 108 | <u>6.00</u> | <u>32</u> | 4 | 0.6 | Comparative Example |
| 109 | <u>6.00</u> | <u>34</u> | 4 | 0.6 | Comparative Example |
| 110 | 3.00 | 40 | 4 | 0.6 | Invention Example |

Underlines indicate that values are outside the scope of the present invention.

TABLE 5B

Configuration and production conditions of resin film-laminated metal sheet (covering material of laminated panel)

| | | Film combination | | | Production conditions of resin film-laminated metal sheet | | | |
| | | | | | Threading rate of non-lubricated steel sheet before continuous | Threading rate of non-lubricated steel sheet before continuous | Surface tension of threading roll immediately behind roll coater of continuous manufacturing | Amount of glamour wax applied to surface |
| Experiment No. | Metal sheet | Film that serves as external surface of panel | Film in contact with core layer | Resin film lamination temperature (° C.) | manufacturing of resin film-laminated metal sheet (m/minute) | manufacturing of resin film-laminated metal sheet (m) | facility of of resin film-laminated metal sheet (mN/m) | of film in contact with core layer (mg/m²) |
|---|---|---|---|---|---|---|---|---|
| 111 | M5 | E1 | E1 | 270 | 50 | 1000 | 36 | 2.0 |
| 112 | M5 | E1 | E1 | 270 | 40 | 1000 | 32 | 2.0 |
| 113 | M5 | E1 | E1 | 270 | 50 | 950 | 34 | 2.0 |
| 114 | M5 | E1 | E1 | 270 | 100 | 1000 | 38 | 2.0 |
| 115 | M6 | E1 | E1 | 270 | 50 | 1000 | 36 | 2.0 |
| 116 | M6 | E1 | E1 | 270 | 40 | 1000 | 32 | 2.0 |
| 117 | M6 | E1 | E1 | 270 | 50 | 950 | 34 | 2.0 |
| 118 | M6 | E1 | E1 | 270 | 100 | 1000 | 38 | 2.0 |
| 119 | M1 | E4 | E4 | 245 | 50 | 1000 | 36 | 2.0 |
| 120 | M1 | E4 | E4 | 245 | 40 | 1000 | 32 | 2.0 |
| 121 | M1 | E4 | E4 | 245 | 50 | 950 | 34 | 2.0 |
| 122 | M1 | E4 | E4 | 245 | 100 | 1000 | 38 | 2.0 |
| 123 | M2 | E4 | E4 | 245 | 50 | 1000 | 36 | 2.0 |
| 124 | M2 | E4 | E4 | 245 | 40 | 1000 | 32 | 2.0 |
| 125 | M2 | E4 | E4 | 245 | 50 | 950 | 34 | 2.0 |

| | Configuration and production conditions of resin film-laminated metal sheet (covering material of laminated panel) | | Configuration of core layer of laminated panel | | |
| Experiment No. | Amount of residual wax on surface of laminated metal sheet on external surface side of laminated panel (mg/m²) | Surface tension on surface that is in contact with core layer (mN/m) | Thickness of core layer (kind of resin isocyanate, polyol-based two-component fast curing-type hard foamed urethane) (mm) | Density of resin layer (g/cm³) | Distinction between Invention Example and Comparative Example |
|---|---|---|---|---|---|
| 111 | 5.00 | 36 | 4 | 0.6 | Invention Example |
| 112 | 6.00 | 32 | 4 | 0.6 | Comparative Example |
| 113 | 6.00 | 34 | 4 | 0.6 | Comparative Example |
| 114 | 3.00 | 40 | 4 | 0.6 | Invention Example |
| 115 | 5.00 | 36 | 4 | 0.6 | Invention Example |
| 116 | 6.00 | 32 | 4 | 0.6 | Comparative Example |
| 117 | 6.00 | 34 | 4 | 0.6 | Comparative Example |
| 118 | 3.00 | 40 | 4 | 0.6 | Invention Example |
| 119 | 5.00 | 36 | 4 | 0.6 | Invention Example |
| 120 | 6.00 | 32 | 4 | 0.6 | Comparative Example |
| 121 | 6.00 | 34 | 4 | 0.6 | Comparative Example |
| 122 | 3.00 | 40 | 4 | 0.6 | Invention Example |
| 123 | 4.00 | 36 | 4 | 0.6 | Invention Example |
| 124 | 6.00 | 32 | 4 | 0.6 | Comparative Example |
| 125 | 6.00 | 34 | 4 | 0.6 | Comparative Example |

Underlines indicate that values are outside the scope of the present invention.

TABLE 5C

Configuration and production conditions of resin film-laminated metal sheet (covering material of laminated panel)

| | | Film combination | | | Production conditions of resin film-laminated metal sheet | | | |
| | | Film that serves as external surface of panel | Film in contact with core layer | Resin film lamination temperature (°C.) | Threading rate of non-lubricated steel sheet before continuous manufacturing of resin film-laminated metal sheet (m/minute) | Threading rate of non-lubricated steel sheet before continuous manufacturing of resin film-laminated metal sheet (m) | Surface tension of threading roll immediately behind roll coater of continuous manufacturing facility of resin film-laminated metal sheet (mN/m) | Amount of glamour wax applied to surface of film in contact with core layer (mg/m²) |
| Experiment No. | Metal sheet | | | | | | | |
|---|---|---|---|---|---|---|---|---|
| 126 | M2 | E4 | E4 | 245 | 100 | 1000 | 38 | 2.0 |
| 127 | M3 | E4 | E4 | 245 | 50 | 1000 | 36 | 2.0 |
| 128 | M3 | E4 | E4 | 245 | 40 | 1000 | 32 | 2.0 |
| 129 | M3 | E4 | E4 | 245 | 50 | 950 | 34 | 2.0 |
| 130 | M3 | E4 | E4 | 245 | 100 | 1000 | 38 | 2.0 |
| 131 | M4 | E4 | E4 | 245 | 50 | 1000 | 36 | 2.0 |
| 132 | M4 | E4 | E4 | 245 | 40 | 1000 | 32 | 2.0 |
| 133 | M4 | E4 | E4 | 245 | 50 | 950 | 34 | 2.0 |
| 134 | M4 | E4 | E4 | 245 | 100 | 1000 | 38 | 2.0 |
| 135 | M5 | E4 | E4 | 245 | 50 | 1000 | 36 | 2.0 |
| 136 | M5 | E4 | E4 | 245 | 40 | 1000 | 32 | 2.0 |
| 137 | M5 | E4 | E4 | 245 | 50 | 950 | 34 | 2.0 |
| 138 | M5 | E4 | E4 | 245 | 100 | 1000 | 38 | 2.0 |
| 139 | M6 | E4 | E4 | 245 | 50 | 1000 | 36 | 2.0 |
| 140 | M6 | E4 | E4 | 245 | 40 | 1000 | 32 | 2.0 |
| 141 | M6 | E4 | E4 | 245 | 50 | 950 | 34 | 2.0 |
| 142 | M6 | E4 | E4 | 245 | 100 | 1000 | 38 | 2.0 |

| | Configuration and production conditions of resin film-laminated metal sheet (covering material of laminated panel) | | Configuration of core layer of laminated panel | | |
| Experiment No. | Amount of residual wax on surface of laminated metal sheet on external surface side of laminated panel (mg/m²) | Surface tension on surface that is in contact with core layer (mN/m) | Thickness of core layer (kind of resin isocyanate, polyol-based two-component fast curing-type hard foamed urethane) (mm) | Density of resin layer (g/cm³) | Distinction between Invention Example and Comparative Example |
|---|---|---|---|---|---|
| 126 | 3.00 | 40 | 4 | 0.6 | Invention Example |
| 127 | 5.00 | 36 | 4 | 0.6 | Invention Example |
| 128 | 6.00 | 32 | 4 | 0.6 | Comparative Example |
| 129 | 6.00 | 34 | 4 | 0.6 | Comparative Example |
| 130 | 3.00 | 40 | 4 | 0.6 | Invention Example |
| 131 | 4.00 | 36 | 4 | 0.6 | Invention Example. |
| 132 | 6.00 | 32 | 4 | 0.6 | Comparative Example |
| 133 | 6.00 | 34 | 4 | 0.6 | Comparative Example |
| 134 | 3.00 | 40 | 4 | 0.6 | Invention Example |
| 135 | 5.00 | 36 | 4 | 0.6 | Invention Example |
| 136 | 6.00 | 32 | 4 | 0.6 | Comparative Example |
| 137 | 6.00 | 34 | 4 | 0.6 | Comparative Example |
| 138 | 3.00 | 40 | 4 | 0.6 | Invention Example |
| 139 | 5.00 | 36 | 4 | 0.6 | Invention Example |
| 140 | 6.00 | 32 | 4 | 0.6 | Comparative Example |
| 141 | 6.00 | 34 | 4 | 0.6 | Comparative Example |
| 142 | 3.00 | 40 | 4 | 0.6 | Invention Example |

Underlines Indicate that values are outside the scope of the present invention.

TABLE 6A

| | Characteristic determination results of resin metal laminated panels | | | | | |
|---|---|---|---|---|---|---|
| | Determination results of film peel strength of resin film-laminated metal sheet | | Determination results of air | Determination results of peel strength of resin | Determination results of | Distinction between Invention |
| Experiment No. | Film that serves as external surface of panel | Film in contact with core layer | bubble size distribution in core layer | film-laminated metal sheet of laminated panel | impact resistance of laminated panel | Example and Comparative Example |
| 95 | Favorable | Favorable | Excellent | Acceptable | Acceptable | Invention Example |
| 96 | Favorable | Favorable | Excellent | Unacceptable | Unacceptable | Comparative Example |
| 97 | Favorable | Favorable | Excellent | Unacceptable | Unacceptable | Comparative Example |
| 98 | Favorable | Favorable | Excellent | Favorable | Favorable | Invention Example |
| 99 | Favorable | Favorable | Excellent | Acceptable | Acceptable | Invention Example |
| 100 | Favorable | Favorable | Excellent | Unacceptable | Unacceptable | Comparative Example |
| 101 | Favorable | Favorable | Excellent | Unacceptable | Unacceptable | Comparative Example |
| 102 | Favorable | Favorable | Excellent | Favorable | Favorable | Invention Example |
| 103 | Favorable | Favorable | Excellent | Acceptable | Acceptable | Invention Example |
| 104 | Favorable | Favorable | Excellent | Unacceptable | Unacceptable | Comparative Example |
| 105 | Favorable | Favorable | Excellent | Unacceptable | Unacceptable | Comparative Example |
| 106 | Favorable | Favorable | Excellent | Favorable | Favorable | Invention Example |
| 107 | Favorable | Favorable | Excellent | Acceptable | Acceptable | Invention Example |
| 108 | Favorable | Favorable | Excellent | Unacceptable | Unacceptable | Comparative Example |
| 109 | Favorable | Favorable | Excellent | Unacceptable | Unacceptable | Comparative Example |
| 110 | Favorable | Favorable | Excellent | Favorable | Favorable | Invention Example |

Underlines indicate that values are outside the scope of the present invention.

TABLE 6B

| | Characteristic determination results of resin metal laminated panels | | | | | |
|---|---|---|---|---|---|---|
| | Determination results of film peel strength of resin film-laminated metal sheet | | Determination results of air | Determination results of peel strength of resin | Determination results of | Distinction between Invention |
| Experiment No. | Film that serves as external surface of panel | Film in contact with core layer | bubble size distribution in core layer | film-laminated metal sheet of laminated panel | impact resistance of laminated panel | Example and Comparative Example |
| 111 | Favorable | Favorable | Excellent | Acceptable | Acceptable | Invention Example |
| 112 | Favorable | Favorable | Excellent | Unacceptable | Unacceptable | Comparative Example |
| 113 | Favorable | Favorable | Excellent | Unacceptable | Unacceptable | Comparative Example |
| 114 | Favorable | Favorable | Excellent | Favorable | Favorable | Invention Example |
| 115 | Favorable | Favorable | Excellent | Acceptable | Acceptable | Invention Example |
| 116 | Favorable | Favorable | Excellent | Unacceptable | Unacceptable | Comparative Example |
| 117 | Favorable | Favorable | Excellent | Unacceptable | Unacceptable | Comparative Example |
| 118 | Favorable | Favorable | Excellent | Favorable | Favorable | Invention Example |
| 119 | Favorable | Favorable | Excellent | Acceptable | Acceptable | Invention Example |
| 120 | Favorable | Favorable | Excellent | Unacceptable | Unacceptable | Comparative Example |
| 121 | Favorable | Favorable | Excellent | Unacceptable | Unacceptable | Comparalive Example |
| 122 | Favorable | Favorable | Excellent | Favorable | Favorable | Invention Example |
| 123 | Favorable | Favorable | Excellent | Acceptable | Acceptable | Invention Example |
| 124 | Favorable | Favorable | Excellent | Unacceptable | Unacceptable | Comparative Example |
| 125 | Favorable | Favorable | Excellent | Unacceptable | Unacceptable | Comparative Example |

Underlines indicate that values are outside the scope of the present invention.

TABLE 6C

| | Determination results of film peel strength of resin film-laminated metal sheet | | Determination results of air | Determination results of peel strength of resin | Determination results of | Distinction between Invention |
|---|---|---|---|---|---|---|
| Experiment No. | Film that serves as external surface of panel | Film in contact with core layer | bubble size distribution in core layer | film-laminated metal sheet of laminated panel | impact resistance of laminated panel | Example and Comparative Example |
| 126 | Favorable | Favorable | Excellent | Favorable | Favorable | Invention Example |
| 127 | Favorable | Favorable | Excellent | Acceptable | Acceptable | Invention Example |
| 128 | Favorable | Favorable | Excellent | Unacceptable | Unacceptable | Comparative Example |
| 129 | Favorable | Favorable | Excellent | Unacceptable | Unacceptable | Comparative Example |
| 130 | Favorable | Favorable | Excellent | Favorable | Favorable | Invention Example |
| 131 | Favorable | Favorable | Excellent | Acceptable | Acceptable | Invention Example |
| 132 | Favorable | Favorable | Excellent | Unacceptable | Unacceptable | Comparative Example |
| 133 | Favorable | Favorable | Excellent | Unacceptable | Unacceptable | Comparative Example |
| 134 | Favorable | Favorable | Excellent | Favorable | Favorable | Invention Example |
| 135 | Favorable | Favorable | Excellent | Acceptable | Acceptable | Invention Example |
| 136 | Favorable | Favorable | Excellent | Unacceptable | Unacceptable | Comparalive Example |
| 137 | Favorable | Favorable | Excellent | Unacceptable | Unacceptable | Comparative Example |
| 138 | Favorable | Favorable | Excellent | Favorable | Favorable | Invention Example |
| 139 | Favorable | Favorable | Excellent | Acceptable | Acceptable | Invention Example |
| 140 | Favorable | Favorable | Excellent | Unacceptable | Unacceptable | Comparative Example |
| 141 | Favorable | Favorable | Excellent | Unacceptable | Unacceptable | Comparative Example |
| 142 | Favorable | Favorable | Excellent | Favorable | Favorable | Invention Example |

Underlines indicate that values airc outside the scope of the present invention.

Specifically, the contents are as described below.

The configuration materials of the resin film-laminated metal sheets will be described below.

[Metal Sheets]

Metal sheets M1 to M8 shown in Table 1 were used.

M1 is a metallic chromium-plated steel sheet having a 0.08 mm-thick Cr oxide/hydroxide chemical conversion coating.

M2 is a metallic chromium-plated steel sheet having a 0.80 mm-thick Cr oxide/hydroxide chemical conversion coating.

M3 is a Sn—Fe alloy-plated steel sheet having a 0.08 mm-thick Zr oxide/hydroxide chemical conversion coating.

M4 is a Sn—Fe alloy-plated steel sheet having a 0.80 mm-thick Zr oxide/hydroxide chemical conversion coating.

M5 is an A5052-based aluminum sheet having a 0.15 mm-thick Zr oxide/hydroxide chemical conversion coating.

M6 is an A5052-based aluminum sheet having a 2.50 mm-thick Zr oxide/hydroxide chemical conversion coating.

M7 is a metallic chromium-plated steel sheet having a 0.07 mm-thick Cr oxide/hydroxide chemical conversion coating.

M8 is an A5052-based aluminum sheet having a 0.14 mm-thick Zr oxide/hydroxide chemical conversion coating.

[Thermoplastic Resin Films]

Resin film-laminated metal sheets were produced using films E1 to E12 shown in Table 2. Surface tension and surface roughness shown below are the surface roughness of a surface of the film opposite to the other surface that is fused to the metal sheet.

E1 is a thermoplastic stretched homo polyethylene terephthalate resin (PET) film having a surface tension of 48 mN/m, a surface roughness Ra of 0.2 μm and a thickness of 8 μm.

E2 is a thermoplastic stretched homo polyethylene terephthalate resin (PET) film having a surface tension of 48 mN/m, a surface roughness Ra of 0.2 μm and a thickness of 50 μm.

E3 is a thermoplastic stretched polyethylene terephthalate resin-isophthalate 8 mol % copolymer resin (PET-IA) film having a surface tension of 50 mN/m, a surface roughness Ra of 0.2 μm and a thickness of 8 μm.

E4 is a thermoplastic stretched polyethylene terephthalate resin-isophthalate 8 mol % copolymer resin (PET-IA) film having a surface tension of 50 mN/m, a surface roughness Ra of 0.2 μm and a thickness of 50 μm.

E5 is a thermoplastic stretched polyethylene terephthalate resin-isophthalate 8 mol % copolymer resin (PET-IA) film having a surface tension of 50 mN/m, a surface roughness Ra of 0.2 μm and a thickness of 6 μm.

E6 is a thermoplastic stretched polyethylene terephthalate resin-isophthalate 8 mol % copolymer resin (PET-IA) film having a surface tension of 50 mN/m, a surface roughness Ra of 0.2 μm and a thickness of 52 μm.

E7 is a thermoplastic non-stretched polyethylene terephthalate resin-isophthalate 8 mol % copolymer resin (PET-IA) film having a surface tension of 52 mN/m, a surface roughness Ra of 0.3 μm and a thickness of 20 μm.

E8 is a thermoplastic stretched polyethylene terephthalate resin-polybutylene terephthalate 50 mass % copolymer resin (PET-PBT) film having a surface tension of 50 mN/m, a surface roughness Ra of 0.2 μm and a thickness of 25 μm.

E9 is a thermoplastic non-stretched phthalic anhydride-modified polypropylene-based resin (PP) film having a surface tension of 36 mN/m, a surface roughness Ra of 0.2 μm and a thickness of 25 μm.

E10 is a thermoplastic non-stretched corona-treated polypropylene resin (PP) film having a surface tension of 34 mN/m, a surface roughness Ra of 0.3 μm and a thickness of 25 μm.

E11 is a thermosetting soft polyurethane film having a surface tension of 44 mN/m, a surface roughness Ra of 0.3 μm and a thickness of 25 μm.

E12 is a thermoplastic non-stretched polyethylene terephthalate (PET)-modified polyethylene (PE) coextruded film having a surface tension of 48 mN/m [polyethylene terephthalate] on a surface that is fused to the metal sheet, a surface tension of 36 mN/m (maleic anhydride-modified polyethylene) on a surface opposite to the surface that is fused to the metal sheet, a surface roughness Ra of 0.1 μm and a thickness of 50 μm.

[Resin Film-Laminated Metal Sheets]

Resin film-laminated metal sheets were produced according to configurations and lamination conditions shown in Tables 3A to 3F and Tables 5A to 5C.

[Laminated Panels]

Each of the resin film-laminated metal sheets manufactured above was cut into 200 mm×250 mm pieces, the pieces were set on the upper surface side and the lower surface side of an injection mold, the mold was filled with a foaming raw material containing a polyisocyanate and a polyol through an injection opening on the lateral side of the mold within 30 seconds while mixing the foaming raw material, the foaming raw material was held at a pressure of 20 kN/m² for approximately 30 seconds, and then, the upper and lower molds were opened, thereby obtaining a laminated panel (core layer: hard foamed urethane resin (specific weight: 0.6), laminated panel thickness: 4 mm)

[Characteristic Determination Results of Laminated Panels]

Whether the characteristics of the laminated panels were favorable or not was determined by the following methods based on the relationships between a variety of characteristics described above and characteristics relating to the performance of the laminated panels.

(1) Determination of Thermoplastic Resin Film Peel Strength of Resin Film-Laminated Metal Sheet The peel strength between the metal sheet and the thermoplastic resin film in the resin film-laminated metal sheet (the strength of chestnut for films) was measured by the following method. A 180° peeling test piece of a film having a film peelable width of 15 mm was produced, the film was pulled apart at a tensile rate of 20 mm/minute at room temperature, and the 180° peel strength of the film was measured. The obtained peel strength was determined based on the following standards. The peel strengths that were evaluated as acceptable or favorable were regarded as pass. The obtained results are shown in Tables 4A to 4F and Tables 6A to 6C.

Favorable: 10 N/15 mm≤(film peel strength)

Acceptable: 5 N/15 mm≤(film peel strength)<10 N/15 mm

Unacceptable: (Film peel strength)<5 N/15 mm (2) Measurement of Air Bubble Sizes in Core Layer From the central position of the produced laminated panel, a 15 mm-long and 10 mm-wide test piece was cut and collected with a high-speed precision cutter (FINE CUT SP-320Z manufactured by Heiwa Technica Co., Ltd.), and an embedded polishing specimen of a cross section in an urethane resin injection direction was produced. In the core layer in the produced cross section polishing specimen, air bubbles in individual visual fields at three sites of the upper portion, the middle portion and the lower portion of the laminated panel were observed at a magnification of 50 times using a digital optical microscope, and the diameters of the air bubbles in each layer were measured using the length measurement function of the digital optical microscope. The obtained maximum air bubble diameter was determined based on the following standards. The maximum air bubble diameters that were evaluated as acceptable, favorable or excellent were regarded as pass. The obtained results are shown in Tables 4A to 4F and Tables 6A to 6C.

Excellent: A case where the maximum air bubble diameter in the visual fields in the core layer cross section is 200 μm or less Favorable: A case where the maximum air bubble diameter in the visual fields in the core layer cross section is more than 200 μm to 300 μm or less Acceptable: A case where the maximum air bubble diameter in the visual fields in the core layer cross section is more than 300 μm to 500 μm or less Unacceptable: A case where the maximum air bubble diameter in the visual fields in the core layer cross section is more than 500 μm (3) Resin Film-Laminated Metal Sheet Peel Strength of Laminated Panel The laminated panel produced above was cut with a high-speed precision cutter to collect a 25 mm-wide and 150 mm-long test piece, and the resin film-laminated metal sheets on both surfaces at one test piece end were peeled off approximately 30 mm, thereby producing grip portions for pinching the test piece with chucks of a tensile tester.

The grip portions of the resin film-laminated metal sheets on both surfaces of the test piece were pinched with the chucks of the tensile tester, the resin film-laminated metal sheet was peeled off 100 mm (the amount of the chucks moved was 200 mm) at a tensile rate of 200 mm/minute, and the peel strength (laminated metal sheet peel strength) between the resin film-laminated metal sheet and the hard foamed urethane resin in the core layer was measured. The peel strength at the time of peeling off the resin film-laminated metal sheet 100 mm was determined based on the following standards. The peel strengths that were evaluated as acceptable or favorable were regarded as pass. The obtained results are shown in Tables 4A to 4F and Tables 6A to 6C.

Favorable: 10 N/25 mm≤(laminated metal sheet peel strength)

Acceptable: 5 N/25 mm≤(laminated metal sheet peel strength)<10 N/25 mm

Unacceptable: (Laminated metal sheet peel strength)<5 N/25 mm (4) Impact Resistance Determination of Laminated Panels The produced laminated panel was cut into a 25 mm-wide and 150 mm-long piece with a high-speed precision cutter, and the piece was used as an impact resistance test piece.

In an impact resistance test, a dice in which the distance between support points was 100 mm and a roll-shaped support portion having a radius of 2.5 mm at the tip of the support portion was provided was installed in a Dupont impact tester, a semicircular column-shaped upper punch having a radius of 5 mm was attached as an impact indenter, a weight as heavy as 1 kg was dropped from a height of 60 cm from an impact-receiving portion in the upper portion of the impact indenter, and the impact resistance was determined to be favorable or not based on the following determination standards. The impact resistances that were evaluated as acceptable or favorable were regarded as pass. The obtained results are shown in Tables 4A to 4F and Tables 6A to 6C.

Favorable: There is no dent on the covering material, the laminated panel does not buckle, and the covering material does not peel off.

Acceptable: There are a small number of dents on the covering material, the laminated panel does not buckle, and the covering material locally peels off at a portion hit by the impact indenter.

Unacceptable: The laminated panel buckles or the covering material peels off.

Tables 3A to 3F, 4A to 4F, 5A to 5C and 6A to 6C show the configurations of the resin film-laminated metal sheets as the covering material of the laminated panels (the combinations of the metal sheet shown in Table 1 and the film shown in Table 2), the production conditions therefor, the configurations of the core layers of the laminated panels and the characteristic determination results of the produced laminated panels.

Tables 3A to 3F, 4A to 4F, 5A to 5C and 6A to 6C show the configurations of the resin film-laminated metal sheets, the conditions for the threading of the non-lubricated steel sheets before the manufacturing of the resin film-laminated metal sheets for preventing a decrease in the peel strength of the resin film-laminated metal sheet in the laminated panel due to the transfer of a wax from a manufacturing line at the time of manufacturing the resin film-laminated metal sheet for a covering material of laminated panels with a continuous manufacturing facility of a resin-laminated metal sheet for a container, the configurations of the urethane core layers of the laminated panels, and the determination results of the resin film metal sheet peel strengths of the laminated panels.

As is clear from Tables 3A to 3F, 4A to 4F, 5A to 5C and 6A to 6C, it is found that, in the case of using the resin film-laminated metal sheet of the present invention as a covering material of a laminated panel, excellent laminated panel characteristics are developed.

Experiment Nos. 9, 19, 29, 39, 49 and 59 in Tables 3A to 3D and 4A to 4D were examples of a case where a thermoplastic non-stretched PP film having a film surface tension of 36 mN/m, which is close to the lower limit of the present invention, was used, and, among them, in Experiment Nos. 9, 29 and 49, the thicknesses of the metal sheets in the resin film-laminated metal sheets that were used as the covering materials of the laminated panels were the lower limit of the present invention (steel sheet thickness: 0.08 mm, aluminum sheet thickness: 0.15 mm), the laminated panels did not buckle, but the metal sheets locally peeled off at the portions hit by the impact indenter, and the covering materials were dented. On the other hand, in Experiment Nos. 19, 39 and 59 in Tables 3B to 3D and 4B to 4D, since the thicknesses of the metal sheets in the resin film-laminated metal sheets that were used as the covering materials of the laminated panels were thick, the local peeling of the metal sheets at the portions hit by the impact indenter and dents in the covering materials were not observed.

Experiment Nos. 659 and 69 in Table 3E and Table 4E were cases of the resin film-laminated metal sheets in which no wax immersion treatment was performed and the amount of the wax attached was 0 mg/m$^2$, in which the maximum air bubble diameter of the air bubbles in the urethane core layer of the laminated panel exceeded 500 μm and the impact resistance of the laminated panel deteriorated.

In addition, as is clear from Tables 5A to 5C and Tables 6A to 6C, in the case of manufacturing the resin-laminated metal sheets for a covering material of laminated panels with the continuous manufacturing facility of a resin-laminated metal sheet for a container, the non-lubricated steel sheet was threaded before the manufacturing of the resin film-laminated metal sheet without laminating films, whereby the wax was rarely transferred from the continuous manufacturing facility of the resin film-laminated metal sheet, it became possible to stably apply an extremely small amount of the wax at the time of manufacturing the film-laminated metal sheet, and it was possible to suppress a decrease in the peel strength of the resin film-laminated metal sheet when the laminated panel has been produced.

INDUSTRIAL APPLICABILITY

The resin film-laminated metal sheet for a laminated panel of the present invention has a high adhesion strength to core layers in laminated panels and can be manufactured with a manufacturing facility of a resin film-laminated metal sheet for a container. Therefore, a method for manufacturing the same is capable of manufacturing laminated panels at a low cost, and the resin film-laminated metal sheet for a laminated panel of the present invention is extremely useful as a covering material for lightweight laminated panels for floors and wall materials of building materials, ships and vehicles.

What is claimed is:

1. A resin film-laminated metal sheet comprising:
   a metal sheet; and
   thermoplastic resin films that are fused to both surfaces of the metal sheet,
   wherein the metal sheet is a steel sheet having a thickness of 0.08 mm or more, and, when a surface of the thermoplastic resin film opposite to a surface that is fused to the metal sheet is defined as a first surface,
   a surface tension on the first surface in at least one of the thermoplastic resin films is 50 mN/m or less and 36 mN/m or more, a surface tension on the surface that is fused to the metal sheet is 36 mN/m or more, an amount of a wax present on the first surface is more than 0 mg/m$^2$ and 5.00 mg/m$^2$ or less, and wax is not present within or inside the thermoplastic resin films.

2. A laminated panel, comprising:
   a pair of the resin film-laminated metal sheets according to claim 1,
   wherein, when the resin film-laminated metal sheets are set on an upper surface side and a lower surface side of an injection mold, the mold is filled with a foaming raw material containing a polyisocyanate and a polyol through an injection opening on a lateral side of the mold within 30 seconds while mixing the foaming raw material, and the foaming raw material is held at a pressure of 20 kN/m$^2$ for approximately 30 seconds, thereby forming a foam polyurethane resin between the resin film-laminated metal sheets,
   an adhesion strength between the thermoplastic resin film and the metal sheet is higher than an adhesion strength between the foam polyurethane resin and the thermoplastic resin film.

3. A method for manufacturing a resin film-laminated metal sheet that is a method for manufacturing the resin film-laminated metal sheet according to claim 2,
   wherein, after film lamination, a wax is applied in a range of 0.1 mg/m$^2$ or more and 2.0 mg/m$^2$ or less, and then a resin film-laminated metal sheet is threaded using a threading roll having a surface tension of 36 mN/m or more on a surface of the threading roll.

4. The method for manufacturing a resin film-laminated metal sheet according to claim 3,
   wherein, before the threading of the resin film-laminated metal sheet, a non-lubricated steel sheet is threaded through 1000 m or more at a rate of 50 m/minute or faster without laminating a film, and then the resin film-laminated metal sheet is manufactured and threaded.

5. A method for manufacturing a resin film-laminated metal sheet that is a method for manufacturing the resin film-laminated metal sheet according to claim 1, wherein, after film lamination, a wax is applied in a range of 0.1 mg/m$^2$ or more and 2.0 mg/m$^2$ or less, and then a resin film-laminated metal sheet is threaded using a threading roll having a surface tension of 36 mN/m or more on a surface of the threading roll.

6. The method for manufacturing a resin film-laminated metal sheet according to claim 5, wherein, before the threading of the resin film-laminated metal sheet, a non-lubricated steel sheet is threaded through 1000 m or more at a rate of 50 m/minute or faster without laminating a film, and then the resin film-laminated metal sheet is manufactured and threaded.

7. A laminated panel comprising:

a core layer; and a resin film-laminated metal sheet, wherein the resin film-laminated metal sheet includes a metal sheet; and thermoplastic resin films that are fused to both surfaces of the metal sheet, the metal sheet is a steel sheet having a thickness of 0.08 mm or more, and when a surface of the thermoplastic resin film that is fused to the core layer is defined as a first surface, a surface tension on the first surface in at least one of the thermoplastic resin films is 50 mN/m or less and 36 mN/m or more, a surface tension on a surface that is fused to the metal sheet is 36 mN/m or more, an amount of a wax present on the first surface is more than 0 mg/m$^2$ and 5.00 mg/m$^2$ or less, and wax is not present within or inside the thermoplastic resin films.

8. The laminated panel according to claim 7, wherein an adhesion strength between the thermoplastic resin film and the metal sheet is higher than an adhesion strength between the core layer and the thermoplastic resin film.

\* \* \* \* \*